(12) United States Patent
Tameda et al.

(10) Patent No.: US 7,421,491 B2
(45) Date of Patent: Sep. 2, 2008

(54) METHOD AND SYSTEM FOR MONITORING INDIVIDUAL DEVICES IN NETWORKED ENVIRONMENTS

(75) Inventors: Eiji Tameda, Tokyo (JP); Akira Ishida, Machida (JP); Toru Mukai, Tokyo (JP)

(73) Assignee: Seer Insight Security K.K., Tokyo (JP)

( * ) Notice: Subject to any disclaimer, the term of this patent is extended or adjusted under 35 U.S.C. 154(b) by 625 days.

(21) Appl. No.: 10/271,935

(22) Filed: Oct. 15, 2002

(65) Prior Publication Data
US 2003/0200308 A1   Oct. 23, 2003

Related U.S. Application Data

(60) Provisional application No. 60/375,293, filed on Apr. 23, 2002.

(51) Int. Cl.
*G06F 15/173* (2006.01)
(52) U.S. Cl. ...................................... 709/224
(58) Field of Classification Search ................. 709/203, 709/224; 713/170
See application file for complete search history.

(56) References Cited

U.S. PATENT DOCUMENTS

| | | | | |
|---|---|---|---|---|
| 6,715,083 | B1* | 3/2004 | Tovander | 726/23 |
| 6,801,640 | B1* | 10/2004 | Okubo et al. | 382/118 |
| 7,130,454 | B1* | 10/2006 | Berube et al. | 382/118 |
| 2002/0066034 | A1* | 5/2002 | Schlossberg et al. | 713/201 |
| 2002/0078381 | A1* | 6/2002 | Farley et al. | 713/201 |
| 2002/0104094 | A1* | 8/2002 | Alexander et al. | 725/105 |
| 2002/0111698 | A1* | 8/2002 | Graziano et al. | 700/17 |
| 2002/0178382 | A1* | 11/2002 | Mukai et al. | 713/201 |
| 2003/0093514 | A1* | 5/2003 | Valdes et al. | 709/224 |

* cited by examiner

*Primary Examiner*—Jason Cardone
*Assistant Examiner*—Minh-Chau Nguyen
(74) *Attorney, Agent, or Firm*—Allen J. Moss; Squire, Sanders & Dempsey L.L.P.

(57) ABSTRACT

According to the present invention, improved techniques for monitoring and managing access and activity at individual devices in a networked environment. Specific embodiments can provide individual and workplace productivity enhancement through self-regulation enforced by peer-group monitoring of network and application usage. In accordance with the specific embodiments of the present invention, techniques that reveal activity of individual users at any device, such as a computer telephone, or other device, within the network environment can be used to analyze flows of information within an enterprise, workplace productivity, network security and other applications in enterprises, including business entities, technical entities, and governmental entities. Specific embodiments provide systems, methods, computer programs and apparatus for monitoring activity at networked entities, such as individual devices, computers, other devices, or other networked computing entities. The information obtained from such monitoring can be used to populate databases, for example. Further, or in the alternative, specific embodiments include analyzing the information, and sharing the information with one or more networked computers and/or with other computational entities locally or remotely connectable with the network. Specific embodiments can have a broad range of functionality in a variety of business, technical and governmental applications.

12 Claims, 18 Drawing Sheets

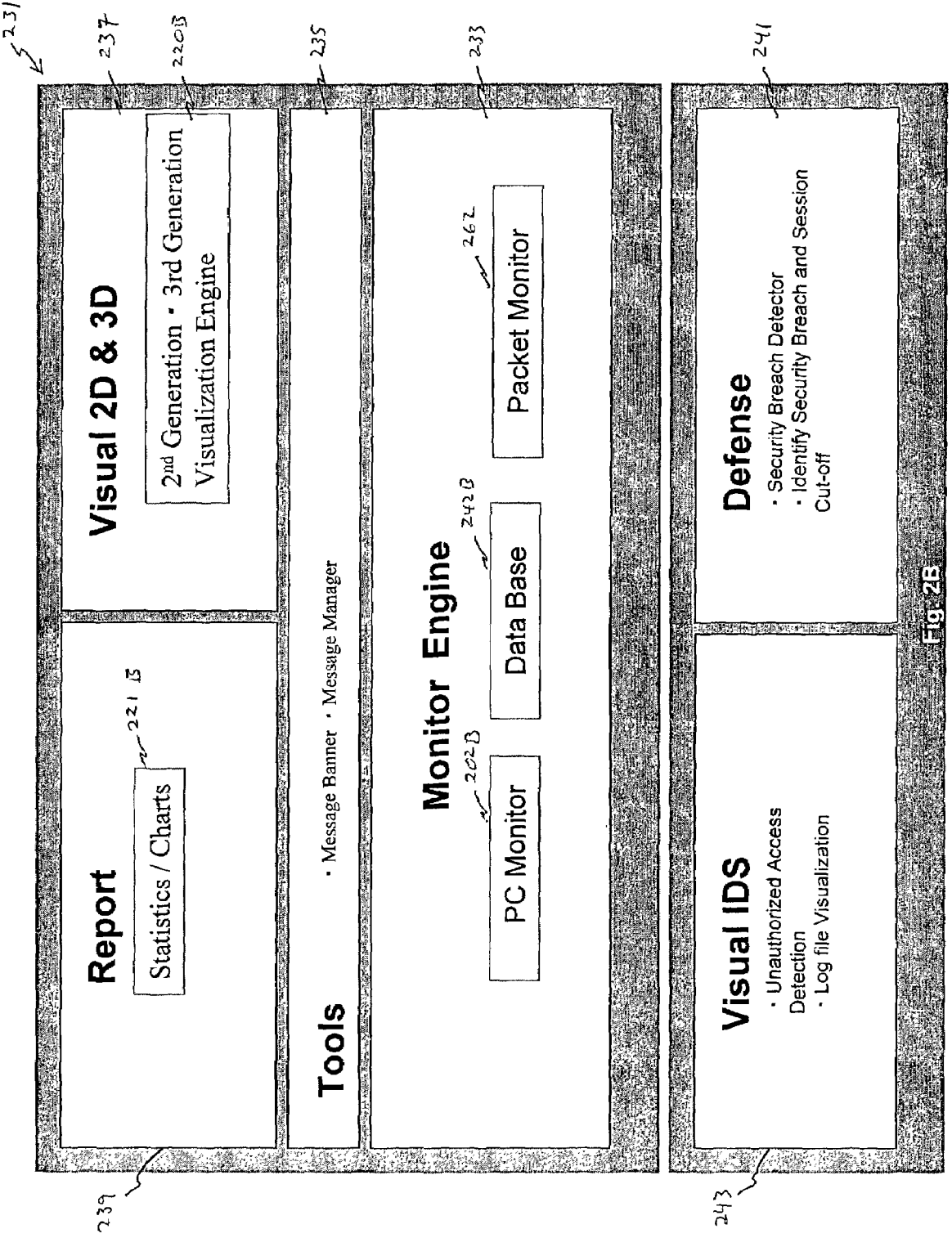

METHOD AND SYSTEM FOR MONITORING INDIVIDUAL DEVICES IN NETWORKED ENVIRONMENTS

CROSS REFERENCE TO RELATED APPLICATIONS

The present application claims the benefit of U.S. Provisional Patent Application Serial No. 60/375,293, entitled "Method And System For Monitoring Individual Workstations In Networked Environments," by Eiji Tameda et al., filed Apr. 23, 2002, which is fully incorporated herein by reference.

BACKGROUND OF THE INVENTION

The present invention relates generally to network security, and in particular to techniques for monitoring and managing activity at individual devices in networked environments.

At a time when many in our society are increasing enjoying greater wealth and status, in large part the benefit of the investment in new technology, such as computer networks and internetworking technologies, a darker side to these technologies has also become increasingly apparent. Sadly, one need not go too far to hear reports that the illicit use of network technology is on the rise. For example, in a number of high-profile cases, the FBI has uncovered child pornography distribution rings that used the Internet to distribute illegal materials. In another example, news and alerts about outbreaks of new computer viruses have become commonplace events. News stories about "hackers," the malevolent individuals who work havoc on a company or a governmental agency through unauthorized access to, and tampering with, that entity's information via its network assets. Other types of computer crime include sophisticated information technology fraud, identity theft, insider trading, intellectual property theft/corporate espionage and misappropriations of company assets. Thus, the technology consumer, provider and developer have become accustomed to the omnipresent threat of computer crime. These individuals, along with law enforcement agencies and governmental bodies, have long searched for ways to address these problems.

One type of security device that has experienced increased use in recent years is the use of firewalls to protect the network assets of a business enterprise, for example, from potential attack from outside the organization. In conventional network security technology, techniques such as firewalls, encryption and the like provide protection against hackers.

While certain advantages to present approaches are perceived, opportunities for further improvement exist. For example, since hackers typically attack the network from outside of the business enterprise, conventional approaches to network security do little if anything to prevent security threats from within an enterprise. Further, conventional approaches rely upon a centralized authority to monitor the network in order to detect attempts to breach security. Still further, conventional approaches do not address waste of corporate assets by individuals within the enterprise.

What is needed are improved techniques for monitoring and managing activity at individual devices in a networked environment.

SUMMARY OF THE INVENTION

The present invention provides improved techniques for monitoring and managing access and activity at individual devices in a networked environment. Specific embodiments can provide individual and workplace productivity enhancement through self-regulation enforced by peer-group monitoring of network and application usage. In accordance with the specific embodiments of the present invention, techniques that reveal activity of individual users at any device, such as a computer, telephone, or other device, and the like, within the network environment can be used to analyze flows of information within an enterprise, workplace productivity, network security and other applications in enterprises, including business entities, technical entities, and governmental entities. Specific embodiments provide systems, methods, computer programs and apparatus for monitoring activity at networked entities, such as individual devices, computers, telephones, or other networked entities. The information obtained from such monitoring can be used to populate databases, for example. Further, or in the alternative, specific embodiments include analyzing the information, and sharing the information with one or more networked computers and/or with other computational entities locally or remotely connectable with the network. Specific embodiments can have a broad range of functionality in a variety of business, technical and governmental applications.

In a representative embodiment, a method capable of establishing a user environment at a computer is provided. The user environment facilitates monitoring security related actions and events at the computer. As used herein, the term event is intended to be broadly construed to mean change of state of the computer or its surrounding environment of any form and in any manner. The events may comprise any of a system event, a file subsystem event, such as a disk access, a user input, such as a keystroke, a mouse input, a selection made at a touch screen device, a trackball input, for example, a network event, such as incoming or outgoing messages from a communications interface, an internal system fault, an external change in environment detected by any of a variety of sensing devices, an input/output (I/O) event, such as printing for example, or the like. The method comprises recognizing events at the computer. The method also includes interpreting the events to obtain synoptic information about the computer. Further, forwarding the synoptic information to at least one other computer for display is also part of the method. As used herein, the term synoptic information is intended to be broadly construed to mean information of any form and in any format that describes the events taking place at the computer. Synoptic information can take a variety of forms and formats in various representative embodiments, such as for example, flat files, structured query language (SQL) format files, hashed data files index access method files, and the like. Specific embodiments may provide the capability to users in a computer network to monitor one another's activities thereby. The computer synoptic information may be forwarded to other computers for storage in a database, for example. In some specific embodiments, the information may be converted from one format into another in order to enable storage and display. In select embodiments, the method further comprises receiving from at least one other computer synoptic information for display. Each of the computers updates a Graphical User Interface (GUI) based upon the synoptic information received from the other computers responsive to receiving the synoptic information from the other computer in specific embodiments. Accordingly, each computer may be enabled to provide a display of events taking place on each of the other computers via the GUI or otherwise.

In some specific embodiments, the method further comprises retrieving computer synoptic information for a computer from a database. The database may be resident on an external computer, database server, a database enabler server, or a co-resident process on one of the computers in the network. The computer synoptic information may be processed to form processed information. This processing can comprise incorporating information based upon a user identity provided during log-on into the computer synoptic information, for example. The processed information may be forwarded to at least one other computer for display. In some specific embodiments, forwarding comprises providing the information in a format displayable in a report area for messages on at least one of a plurality of computers. A scrollable report area may be used to display messages based upon the computer synoptic information.

Depending upon individual application parameters, processing may comprise any or a combination of a variety of activities, including by way of example, analyzing the computer synoptic information. In various embodiments, analyzing the computer synoptic information can include determining at least one of web access time, mail count, print job count, logon time, or the like. The analyzing can also include selecting from among the computer synoptic information based upon a user preference, or the like. Preferences may be user preferences, or the preference of another, and may be specified to the system in a variety of ways. Analyzing may also include generating reports, graphs, charts and the like. Further, analyzing can comprise tracking the computer synoptic information to determine if one or more items have exceeded prescribed limits.

In another representative embodiment, a system is provided. In a typical embodiment, the system comprises a first computer, having an agent resident thereon. A network interface makes the first computer connectable to at least one other computer. The agent is operative to reflect information about activities conducted on the first computer to the at least one other computer. Further, the agent can reflect information about activities conducted on the at least one other computer onto the first computer. In select embodiments, the system can further comprise a database, operatively connectable to the first computer and the at least one other computer by a communications connection such as a network or the like, for example. The database may comprise information about users of the first computer and the at least one other computer, for example. Further, the database can provide a mechanism for storage and retrieval of information about events occurring on either of the first computer, the one other computer, or the both of them. In some specific embodiments, the system may further comprise one or more servers, having an agent resident upon each of the one or more servers. The agent is operative to reflect information about activities on the one or more servers to the first computer and the at least one other computer.

In another embodiment, a system is provided. The system comprises a first device, an agent resident on the first device, and a network interface making the first device connectable to at least one device. The agent is operative to reflect information about activities conducted on the first device to the at least one other device, and to reflect information about activities conducted on the at least one other device onto the first device. In various representative embodiments, either of the first device and/or the other device may be a phone, a mobile phone, a personal data assistant (PDA), pager, computer, navigation system, global positioning system (GPS) device, a digital camera, video camera, home-entertainment-system control box, remote garage door opener, two-way radio, baby monitor, facsimile machine, or office copy machine, for example, and other devices whether coupled using a line circuit or wirelessly. Of course, these examples are not limiting of the many types of devices that may be used in various specific embodiments.

In a yet further embodiment, the system may also include a second device. In various embodiments, the agent is further operative to reflect information about activities conducted on the first device using information gathered at the second device to the at least one other device. In various representative embodiments, the second device may be any of a video camera, a microphone, a smart card reader, a biometric monitor.

In a further representative embodiment, an apparatus is provided. The apparatus comprises means for recognizing events, means for interpreting the events to obtain synoptic information and means for forwarding the synoptic information to at least one other apparatus for display.

In a yet further representative embodiment, an apparatus is provided. The apparatus comprises means for retrieving from a database, computer synoptic information for a device, means for processing the computer synoptic information and means for forwarding the processed information to at least one device for display.

In a yet further representative embodiment, a computer program product is provided. The computer program product can provide a user environment at a computer. The computer program product comprises a computer readable storage medium that holds code that recognizes events at the computer, code that interprets the events to obtain synoptic information and code that forwards the synoptic information to at least one other computer for display.

In a still further representative embodiment, a computer program product is provided. The computer program product comprises a computer readable storage medium that holds code that retrieves from a database, computer synoptic information for a device, code that processes the computer synoptic information and code that forwards the processed information to at least one device for display.

In a yet further representative embodiment, a computer is provided. The computer can comprise an agent, operatively disposed to monitor activities or events, and upon detection, to interpret the activity or event to collect synoptic information. The agent may provide synoptic information to one or more external devices and may reflect synoptic information about activities or events conducted on the one or more other devices. The computer also includes a communications interface, providing connectivity to at least one of a plurality of other computers. An information setting process that, cooperatively with the agent, collects information about events or activities may be resident on the computer. A scrollable banner that displays activities or events occurring with at least one of a plurality of other computers; a report engine that provides reports based upon information received via the communications interface; and a drawing manager that presents information reflecting activities or events may also be part of the computer.

In a yet further representative embodiment, an enabler server is provided. The enabler server can comprise a communications interface, providing connectivity to at least one computer. A converted data exit, operative to provide conversion between formats for information about the at least one computer received via the communications interface can also be included in specific embodiments of the enabler server. The enabler server can also include a database, operative to provide storage and retrieval for the information about the at least one computer received via the communications interface. An analysis engine, operative to perform an analysis upon the information about the at least one computer received via the communications interface to form an analysis result; an authorization engine, operative to control access to the at least one computer; and, at least one of a 2D data manager and a 3D data manager, for providing a presentation of the analysis result may also be included in the enabler server.

In a still yet further representative embodiment, a user interface method is provided. The method includes depicting a view of one user's work environment from the perspective of that user on a screen of another user, the work environment comprising a representation of the one user's display. Depicting content of the one user's display into the representation of the one user's device on the screen of the other user is also part of the method. In specific embodiments, the method can provide a "virtual look over the shoulder view" of the content and environment of the one user's device displayed on the screen of the other user.

In a still yet further representative embodiment, method for monitoring security at one or more computers in a work area(s) of interest is provided. The method includes querying a database for synoptic information about a user logged into a computer located at the work area of interest. Requesting information from a video camera having a view of the work area of interest is also part of the method. The method also includes determining based upon the synoptic information about the user and the information from the video camera, whether the user is present in the work area. In some specific embodiments, notifying of an unauthorized absence for the user who is not at his work area based upon this determination is also included in the method. Comparing information from the video camera to a stored video image of a correct user assigned to the work area to determine whether the correct user is at the work area is also included in the method. In some specific embodiments, notifying of an unauthorized access if the user at the work area is not the correct user based upon this comparison is also part of the method.

In some specific embodiments, the method further comprises determining whether another work area of interest is to be monitored, and if so, repeating querying, requesting, determining and comparing for a new work area of interest. In this way, certain specific embodiments can provide a "virtual security walkthrough" of a workplace premises.

In some specific embodiments, the method further comprises determining based upon the synoptic information whether the user has performed an unauthorized access attempt and notifying other users if the user has performed an unauthorized access attempt. In this way, certain specific embodiments can provide increased peer pressure among users to behave themselves.

In a further embodiment, an apparatus for providing workplace productivity enhancement is provided. The apparatus comprises a means for detecting events relating to network and application usage; a means for monitoring by a peer group of the events; and a means for regulating user activity enforced by the peer-group.

In a yet further embodiment, a method for providing workplace productivity enhancement is provided. The method comprises detecting events relating to network and application usage; monitoring by a peer group of the events; and regulating user activity through enforcement by the peer-group. In specific embodiments, regulation may take the form of increased peer pressure to conform to company policies regarding use of the network and application, for example.

Numerous benefits are achieved by way of the present invention over conventional techniques. Specific embodiments according to the present invention provide the capability to users on a network to be able to see what everyone else is doing on their respective devices. In specific embodiments, group monitoring provides peer pressure of monitoring by one's peers that may prevent unauthorized behavior by individuals with access to the network. Certain specific embodiments can provide notification of an unauthorized access by an employee, thereby increasing peer pressure among users to behave themselves. Select specific embodiments provide a graphical user interface (GUI) presentation of the office or workplace environment. Some specific embodiments can provide the capability to "zoom" into a neighboring users office to view the contents of that neighbor's computer using imaging techniques, thereby creating a "look over the shoulder" view of a neighboring user's computer. Some specific embodiments can provide notification of an unauthorized absence for the user who is not at his work area. Certain specific embodiments can provide a "virtual security walkthrough" in which a person tasked with monitoring the area can virtually check who is at their computers using the monitoring features of the network. Certain specific embodiments can provide notification of an unauthorized access if the user at the work area is not the correct user for the computer.

Some embodiments implement single person logon function that manages messages at the users computer—i.e., news flash, managerial access, workgroup accesses, and the like.

These and other benefits are described throughout the present specification. A further understanding of the nature and advantages of the invention herein may be realized by reference to the remaining portions of the specification and the attached drawings.

BRIEF DESCRIPTION OF THE DRAWINGS

Non-limiting and non-exhaustive embodiments of the present invention are described with reference to the following figures, wherein like reference numerals refer to like parts throughout unless otherwise specified.

FIGS. 2A-2C illustrate representative functional processes capable of providing computer access and activity monitoring and management in specific embodiments of the present invention.

DESCRIPTION OF THE SPECIFIC EMBODIMENTS

The present invention provides techniques for monitoring and managing access and activity at an individual device. In accordance with the specific embodiments of the present invention, techniques that reveal activity of individual users within the network environment can be used to analyze flows of information, workplace productivity, network security, information asset security and other applications in enterprises, including business entities, technical entities, and governmental entities. Specific embodiments provide the capability to monitor activity at networked devices, computational entities, such as individual computers, telephones, and other devices. The information obtained from such monitoring can be used to populate databases for later retrieval and analysis, for example. Select specific embodiments include analyzing the information, and sharing the information with one or more of the networked computers and/or with other computational entities locally or remotely connectable with the network.

Specific embodiments can provide a broad range of functionality in a variety of business, technical and governmental applications. In one of the many applications of the various specific embodiments of the present invention not addressed by conventional approaches is the ability to control and reduce waste of corporate assets by individuals within the enterprise. For example, the simple actions of multiple employees collectively spending time on personal matters during working time is sufficient to reduce the overall effectiveness of the network assets of any corporation. Studies indicate that the average Internet enabled worker uses some portion of his or her workday surfing the Web, communicating with friends or engaging in other activities that are unrelated to work. Some business owners today consider this type of activity to be a waste of computer resources of the enterprise. These and other issues may be successfully addressed by application of techniques according to the present invention, which will be described next in further detail with reference to example specific embodiments as depicted by the accompanying illustrations.

Figure 1A:
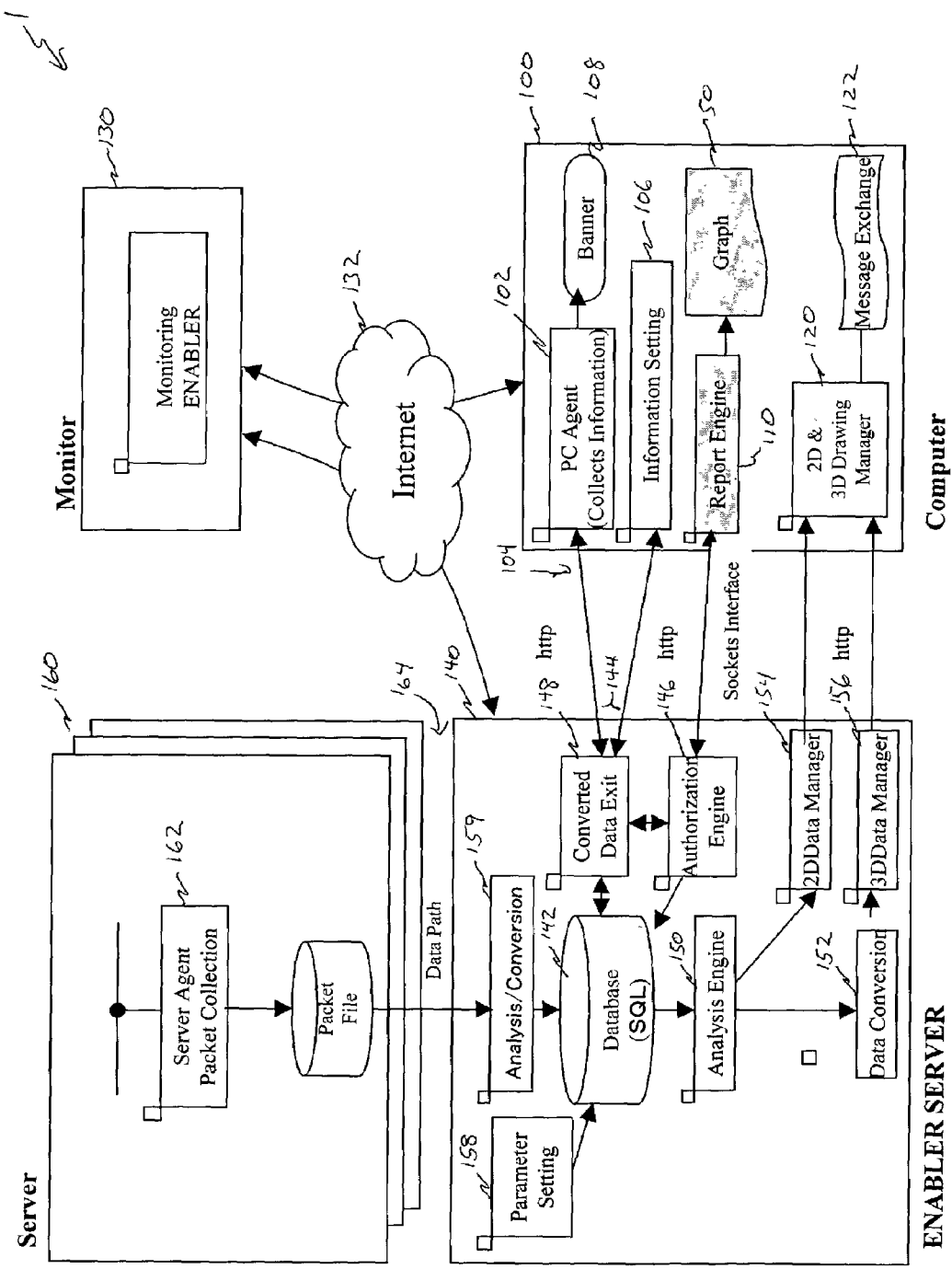
FIGS. 1A-1B illustrate conceptual drawings of representative systems capable of embodying computer access and activity monitoring and managing applications in specific embodiments of the present invention.

FIG. 1A illustrates a conceptual drawing of a representative system capable of embodying computer access and activity monitoring and managing applications in specific embodiments of the present invention. A system 1, as illustrated by FIG. 1A, comprises a computer 100. Computer 100 comprises a variety of both hardware and software components, including an agent 102 which may be operatively disposed in memory of the computer 100, for example. A communications interface 104 enables computer 100 to be connected to one or more other computers or devices. Communications interface 104 can comprise any of a variety of communications means, including hardware and software, but in one preferred embodiment, the communications means is comprised of a network connection using a sockets interface, which employs the hypertext transfer protocol ("http"). Other types of networks and protocols, however, may be implemented in various embodiments of the present invention.

The agent 102 is operative to monitor computer 100 for activities or events conducted on the computer 100, and upon detection, to interpret the activity or event to collect synoptic information about the activity or event. Further, agent 102 is operative to provide this synoptic information to one or more other computers (not shown in FIG. 1A). Accordingly, in specific embodiments, the agent 102, cooperatively with an information setting process 106, and a banner 108, reflect the activities and events of one computer 100 to other computer(s) in system 1. The information setting process 106 may function cooperatively with agent 102 to collect information about events and activities occurring on computer 100 and to provide output regarding activities and events occurring on another computer via banner 108, for example. Banner 108 may comprise a scrollable report area in which messages based upon information about computer 100 may be displayed in select embodiments. The activities and events about which agent 102 collects information can be any of a variety of changes in environment or state, such as any of a system event, a file subsystem event, such as a disk access, a user input, such as a keystroke, a mouse input, a selection made at a touch screen device, a trackball input, for example, a network event, such as incoming or outgoing messages from a communications interface, an internal system fault, an external change in environment detected by any of a variety of sensing devices, an input/output (I/O) event, such as printing for example, or the like.

Computer 100 may also include a variety of presentation processes in various specific embodiments. For example, in the representative embodiment illustrated by FIG. 1A, a report engine 110 provides reports, such as a graph 50, for example, based upon information received from authorization engine 146 of enabler server 140, described herein below. In the representative embodiment illustrated by FIG. 1A, computer 100 further comprises a drawing manager 120, which may be cooperatively coupled to message exchange process 122 for providing information reflecting activities or events. In various specific embodiments drawing manager 120 can provide a graphical user interface (GUI), which may optionally include a variety of 2-dimensional or 3-dimensional presentations or the like. A variety of graphical user interface software packages can be used to provide 2-dimensional or 3-dimensional presentations in various specific embodiments of the present invention, however, in one presently preferred embodiment, a graphical user interface software application called "SCOL VOY@GER" made by "Cryo on Line," a company of France, may be used to provide a 3-dimensional presentation. In another presently preferred embodiment, a user interface provides a 2-dimensional presentation. FIGS. 5A-5H herein depicts screens from one or more of these embodiments.

The system 1 may include a database enabler server 140, comprising a database 142. While illustrated by FIG. 1A as being resident on database enabler server 140, the database 142 may be resident on an external computer, database server, a database enabler server, or a co-resident process on one of the computers in a network in various implementation specific alternative embodiments. In the specific embodiment of FIG. 1A, database enabler server 140 is operatively connectable to the computer 100 and the at least one other computer (not shown in FIG. 1A) by the communications interface 144. In various embodiments, the database 142 comprises a variety of information. For example, in a specific embodiment, database 142 provides storage for information about the computer 100, the at least one other computer (not shown in FIG. 1A) and users thereof.

The database enabler server 140 can comprise a number of other components, which will be described with reference to the example embodiment illustrated in FIG. 1A. An authorization engine 146 provides access control to information in database 142 for report engine 110 of computer 100, for example. In specific embodiments, authorization engine 146 controls access using a combination of user identifier and a password. Users may log on to use computer 100 by specifying their user identifier and password, for example. The computer 100 provides this information to authorization engine 146 in order to obtain access to personal workspace, user specific information and information for generating reports, for example. In a specific embodiment, a picture of the user can be accessed based upon the user's identity for display on the GUI or the like. A converted data exit 148, in conjunction with authorization engine 146, cooperatively couples computer 100 to database 142 by providing conversion of data from one format to another. Converted data exit 148 can convert data in a variety of forms and formats in various representative embodiments, such as for example, converting flat file data into any of structured query language (SQL) format files, hashed data files index access method files, and the like.

An analysis engine 150 component of database enabler server 140 can provide the capability to perform various analyses on information from database 142 in specific embodiments. Analyses can include determining at least one of web access time, mail count, print job count, logon time, or the like, in various applications. The analysis engine 150 can also select from among computer synoptic information based upon a user preference, or the like. Preferences may be user preferences, or the preference of another, and may be specified to the system in a variety of ways. Analyzing may also include generating reports, graphs, charts and the like. Further, analyzing can comprise tracking the computer synoptic information to determine if one or more items have exceeded prescribed limits. The computer synoptic information can be processed by computer 100 to include further information such as authorization and access information provided by authorization engine 146.

A 2-dimensional data manager 154 and/or a 3-dimensional data manager 156 of database enabler server 140 provide the capability to display graphical image representations of the results of the analysis engine 150. The 2-dimensional data manager 154 and the 3-dimensional data manager 156 can comprise any of a variety of visualization means, including hardware and software, but in one preferred embodiment, the visualization means is comprised of a graphical user interface software application called "SCOL VOY@GER" made by "Cryo on Line," a company of France, which may be used to provide a 3-dimensional presentation. Other types of visualization processes, however, may be implemented in various embodiments of the present invention. In specific embodiments, a data conversion engine 152 provides conversion of data from a format output by the analysis engine 150 to a format acceptable by the 2-dimensional data manager 154 and the 3-dimensional data manager 156. An analysis/conversion process 159 provides interface to one or more servers 160, which are discussed herein below.

The system 1 may include one or more servers 160, which may be associated with third party applications, for example. An agent 162 may be resident upon each of the one or more servers 160. The agent 162 is operative to reflect information about activities on the one or more servers 160 to the database enabler server 140 via a data path 164. A packet file process 166 provides formatting of the information from the agent process 162 into network transportable packets for transmission to enabler server 140.

In specific embodiments, a monitoring enabler 130, connectable to the computer 100, the one or more other computers (not shown in FIG. 1A) and the database enabler server 140 by a data path such as the Internet 132 in order to provide supervisory control and maintenance services for the security and monitoring features and functions of system 1.

In another representative embodiment, the system 1 may also include one or more monitoring devices (not shown in FIG. 1A). In such embodiments, the agent 102 is further operative to reflect information about activities conducted on the computer 100 using information gathered from the one or more monitoring devices. In various representative embodiments, the monitoring device may be any of a video camera, a microphone, a smart card reader, a biometric monitor, or the like.

While system 1 is illustrated generally with reference to computer systems, such as computer 100, specific embodiments of the present invention are not so limited. Certain specific embodiments of the present invention may be broadly applied to systems created using a wide array of devices. In such embodiment, system 1 comprises a first device 100, an agent 102 resident on the first device 100, and a network interface 104 making the first device 100 connectable to at least one other device. The agent 102 is operative to reflect information about activities conducted on the first device 100 to the at least one other device, and to reflect information about activities conducted on the at least one other device onto the first device 100. Accordingly, the present invention is broadly applicable to devices such as a phone, a mobile phone, a personal data assistant (PDA), pager, computer, navigation system, global positioning system (GPS) device, a digital camera, video camera, home-entertainment-system control box, remote garage door opener, two-way radio, baby monitor, facsimile machine, or office copy machine, for example, and other devices whether coupled using a line circuit or wirelessly. Of course, these examples are not limiting of the many types of devices that may be used in various specific embodiments.

Figure 1B:
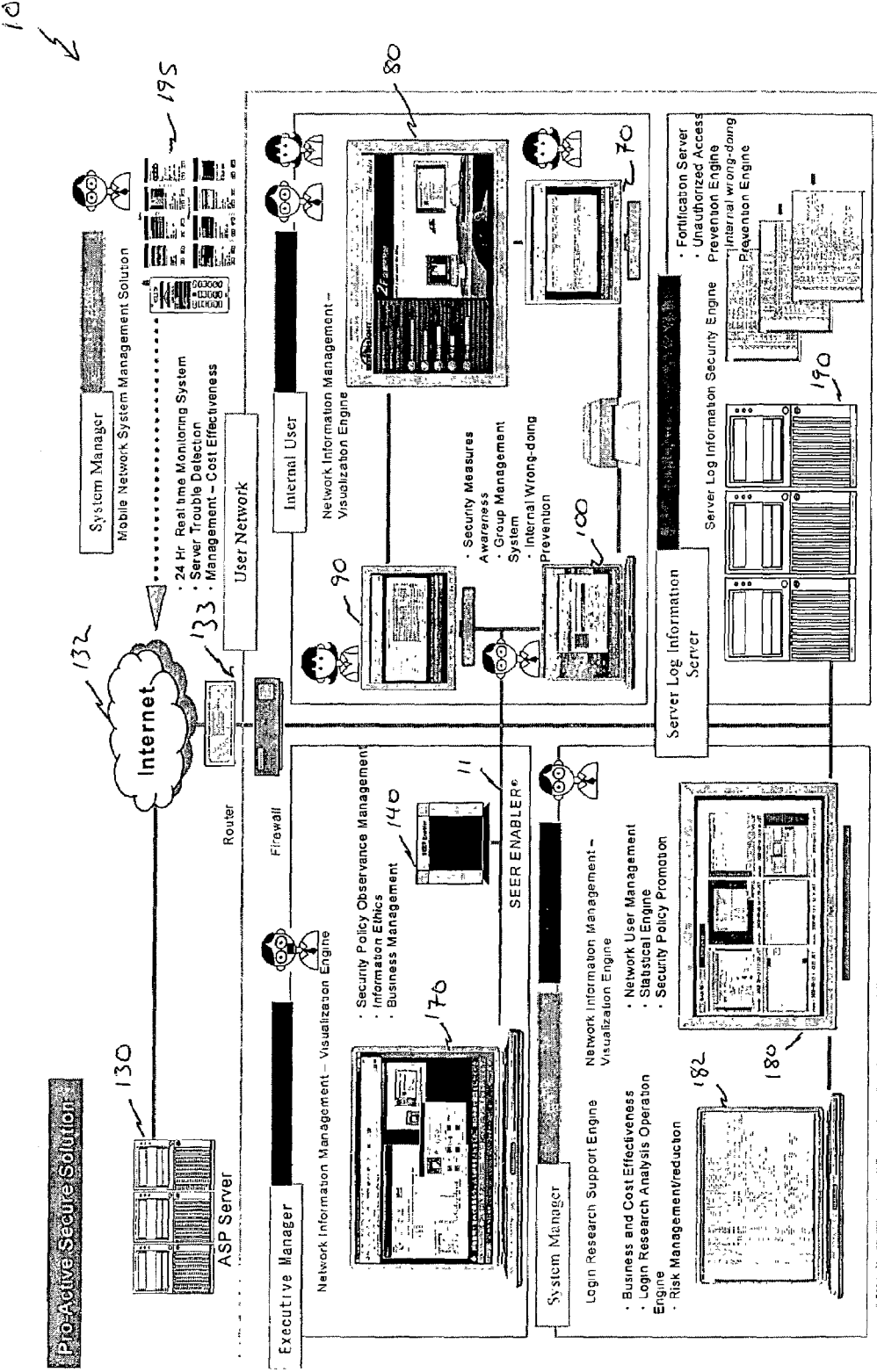

FIG. 1B illustrates a further conceptual drawing of a representative system capable of embodying the present invention. A specific embodiment of an enterprise wide information technology (IT) network system 10 is illustrated by FIG. 1B. The IT network system 10 provides an illustrative example of one of the many ways in which the monitoring and management techniques of the present invention may be integrated into an enterprise wide network. As shown in FIG. 1B, IT network system 10 comprises computer 100, which is connected by a network II to additional computers 90, 80 and 70. Further, database enabler server 140 is accessible to computers 100, 90, 80 and 70 by the network 11. Network 11 also provides connectivity to monitoring enabler 130 via Internet 132 and a firewall/router pair 133.

The system 10 may include an executive manager computer 170 in specific embodiments. Executive manager 170 may be operatively coupled to enabler server 140 and computers 100, 90, 80 and 70 by network 11, for example, or by other communications means. The executive manager 170 can provide a variety of network information management capabilities in various specific embodiments, including, for example, security policy observance and management, information ethics monitoring, business management and the like, for example.

The system 10 may include a system manager computer 180 in specific embodiments. System manager 180 may be operatively coupled to enabler server 140 and computers 100, 90, 80 and 70 by network 11, for example, or by other communications means. The system manager 180 may provide network information management capabilities in various specific embodiments, including, for example network user management, a statistical engine, security policy promotion and the like. Further, in some specific embodiments, a login research support engine 182 may work cooperatively with the system manager 180. The login research support engine 182 provides login research support capabilities such as business and cost effectiveness reports, login research analysis operations, risk management and reduction capabilities and the like.

The system 10 may include a server log information security engine 190 in specific embodiments. Server log information security engine 190 may be operatively coupled to enabler server 140 and computers 100, 90, 80 and 70 by network 11, for example, or by other communications means. The server log information security engine 190 can provide server log information research and monitoring capabilities, such as fortification server functions, unauthorized access prevention, internal wrong-doing prevention and the like.

The system 10 may include a mobile network management system 195 in specific embodiments. The mobile network management system 195 may be operatively coupled to network 11 by Internet 132 and router/firewall pair 133. The mobile network management system 195 can provide 24 hour real time monitoring capability, server trouble detection, cost effective management of the network assets of the enterprise and the like. The mobile network management system 195 can comprise any of a variety of remotely coupled communications means, including hardware and software, but in one preferred embodiment, the mobile network management system 195 is comprised of a browser-enabled mobile telephone, which employs the wireless application protocol ("wap"). Other types of devices and protocols, however, may be implemented in various embodiments of the present invention.

Figure 2A:
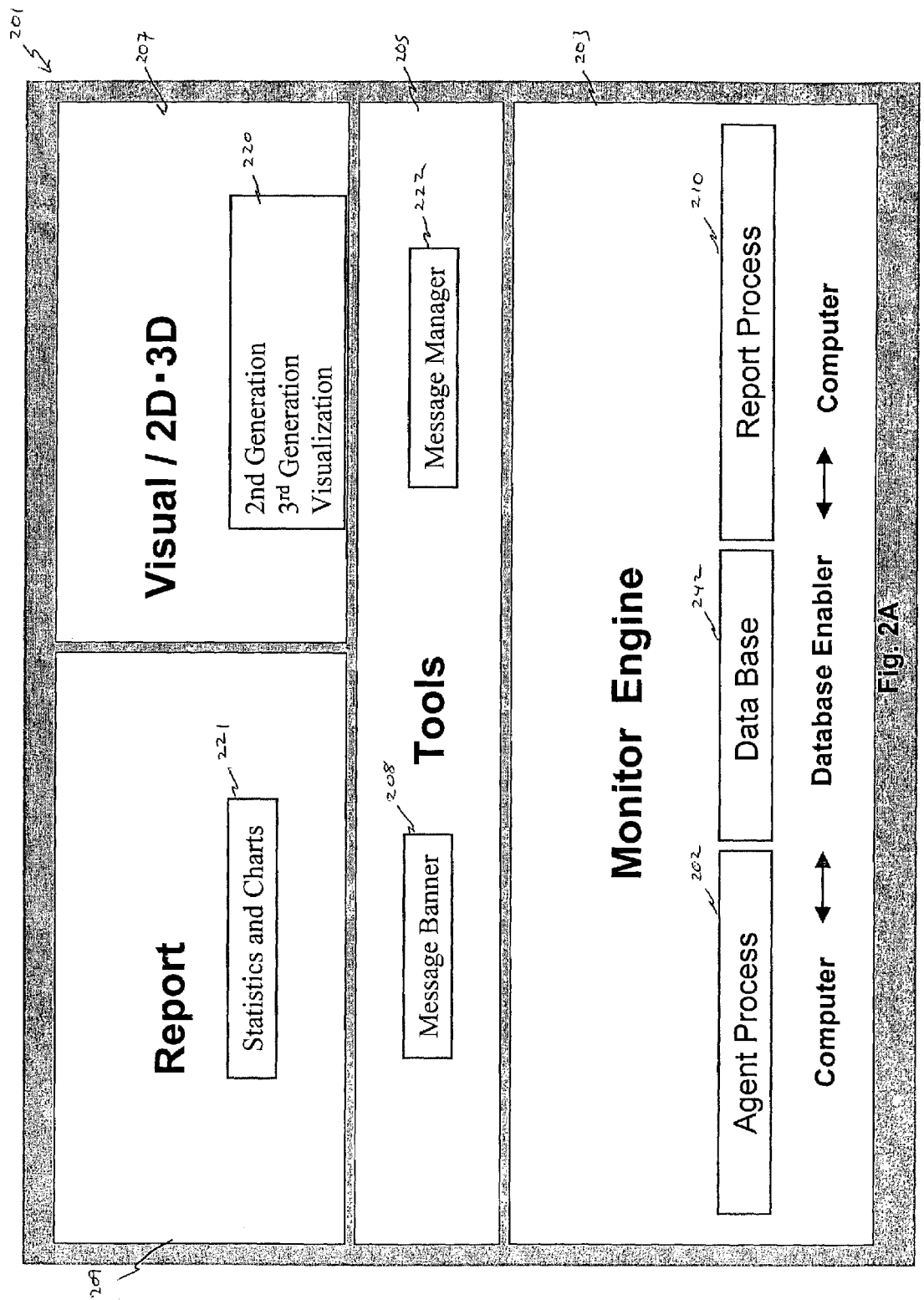
Figure 2C:
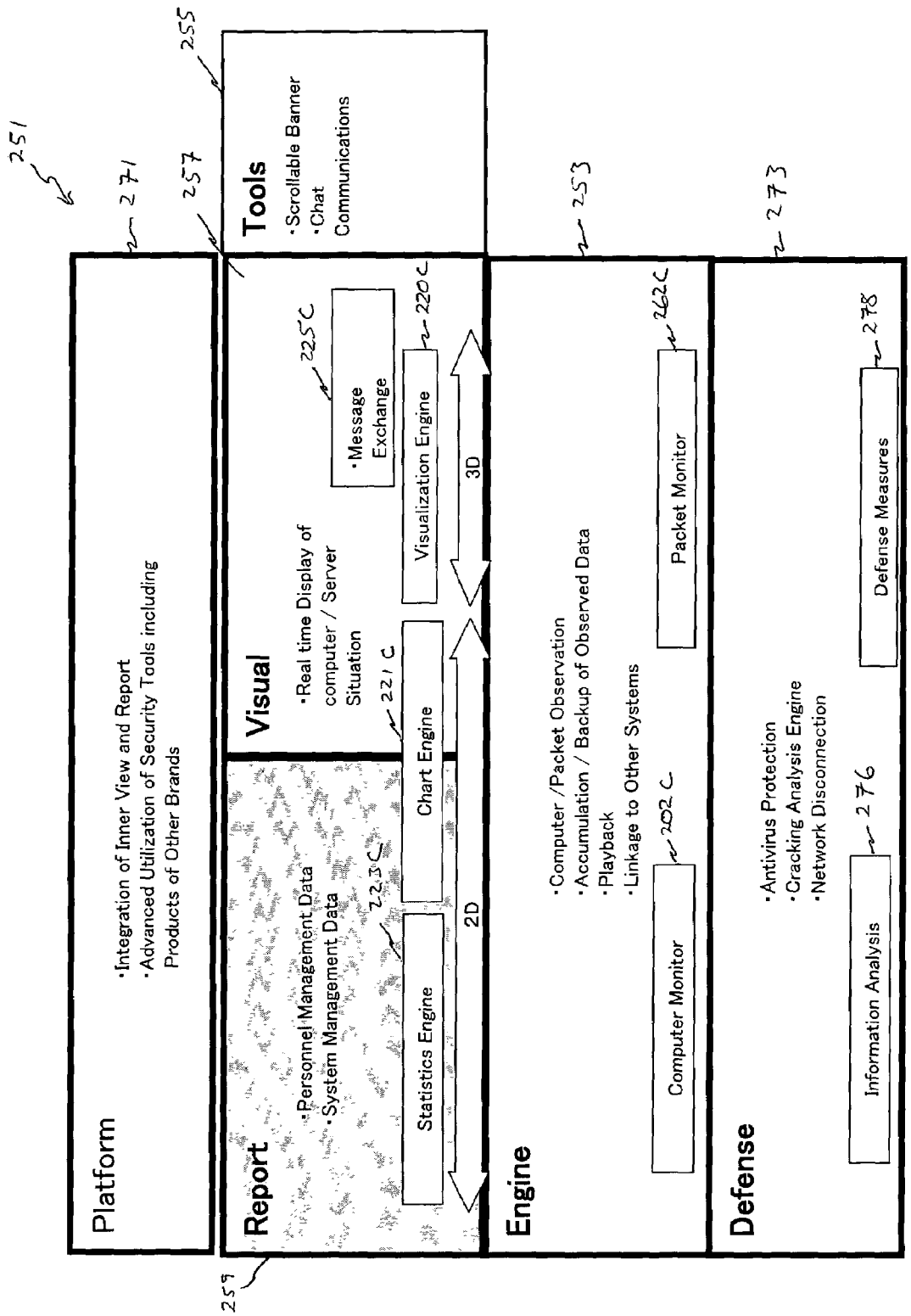

FIGS. 2A-2C illustrate representative functional processes capable of providing computer access and activity monitoring and management in specific embodiments of the present invention. A block diagram 201 in FIG. 2A shows a number of representative functional processes, which may be disposed on the computers comprising system 1, for example, in a specific embodiment of the present invention. As illustrated by block diagram 201, a monitor engine layer 203 provides a basis for processing in this specific embodiment. Monitor engine layer 203 provides the capability for an agent 202, which may be operatively disposed to monitor activities and events on a computer, such as computer 100 in FIG. 1A, for example, and provide synoptic information to database 242, which can be resident on an enabler server, such as database enabler server 140 in FIG. 1A, for example. A report engine 210, which may be operatively disposed on a computer other than computer 100, for example, can process reports based upon information disposed in a database, such as database 242, and provide these reports for display to the user.

A tools layer 205 provides the capability to users to be able to display information to other users on the network using the message banner 208, controllable by a message manager 222, to provide the capability to users, systems administrators and so forth to display messages of interest to all uses on the network. A visual/2D-3D layer 207 provides visualization manager 220, which in various implementations, can include one or more of 2-dimensional and/or 3-dimensional computer graphics imaging processes. A report layer 209 provides a statistics and charts process 221, which provides capabilities to generate various charts and statistical analyses in specific embodiments of the present invention.

A block diagram 231 in FIG. 2B shows a number of representative functional processes, which may be disposed on the computers comprising system I, for example, in a specific embodiment of the present invention. As illustrated by block diagram 231, a monitor engine layer 233 provides a basis for processing in this specific embodiment. Monitor engine layer 233 provides the capability for an agent 202B, which may be operatively disposed to monitor activities and events on a computer, such as computer 100 in FIG. 1A, for example, and provide synoptic information to database 242B, which can be resident on an enabler server, such as database enabler server 140 in FIG. 1A, for example. A packet monitor 262, which may be operatively disposed on a server, such as server 160, for example, can monitor information exchanged with server 160, and provide synoptic information to a database, such as database 242B, for example.

A tools layer 235 provides the capability to users to be able to display information to other users on the network using a message banner, controllable by a message manager, to provides the capability to systems administrators to display messages of interest to all uses on the network. A visual/2D-3D layer 237 provides visualization manager 220B, which in various implementations, can include one or more of 2-dimensional and/or 3-dimensional computer graphics imaging processes. A report layer 239 provides a statistics and charts process 221B, which provides capabilities to generate various charts and statistical analyses in specific embodiments of the present invention. A defense layer 241 provides detection of attempts to breach security, which in specific embodiments can include features to identify the source of the breach and to cut-off access to network assets and resources to the computer on which the breach occurred. A visual IDS layer 243 provides the capability to detect unauthorized accesses to assets in the system 1. Also, in specific embodiments, a log file visualization utility is provided.

A block diagram 251 in FIG. 2C shows a number of representative functional processes, which may be disposed on the computers comprising system 1, for example, in a specific embodiment of the present invention. As illustrated by block diagram 251, an engine layer 253 provides monitoring processing in this specific embodiment. Engine layer 253 provides a computer monitor 202C, which may be operatively disposed to monitor activities and events on a computer, such as computer 100 in FIG. 1A, for example, and provide synoptic information to a database (not shown in FIG. 2C), which can be resident on an enabler server, such as database enabler server 140 in FIG. 1A, for example. A packet monitor 262C, which may be operatively disposed on a server, such as server 160, for example, can monitor information exchanged with server 160, and provide synoptic information to a database, for example. Engine layer 253 processes provide a variety of capabilities in specific embodiments, such as computer/packet observation, accumulation and backup of observed data, playback capabilities, linkages to other devices or systems and the like.

A tools layer 255 provides the capability to users to be able to display information to other users on the network using a message banner, controllable by a message manager, to provides the capability to systems administrators to display messages of interest to all uses using computers in system 1. A visual layer 257 provides a visualization engine 220C, which in various implementations can provide real time display of computer and/or server computer situations. Visual layer 257 can include a message exchange process 225C as well. A report layer 259 provides a statistics engine 223C and a chart engine 221C, which may be shared with visual layer 257. Report layer 259 provides capabilities to manage personnel information and system information in specific embodiments of the present invention. In specific embodiments, a platform layer 271 provides integrated display viewing and report generating and compatibility interfacing with security products of various manufacturers. A defense layer 273 comprises an information analysis engine 276 and a defense measures engine 278. The information analysis engine 276 and a defense measures engine 278 provide anti-virus protection, cracking analysis and network disconnect to prevent breaches of security in the computing assets in the system 1.

Figure 3:
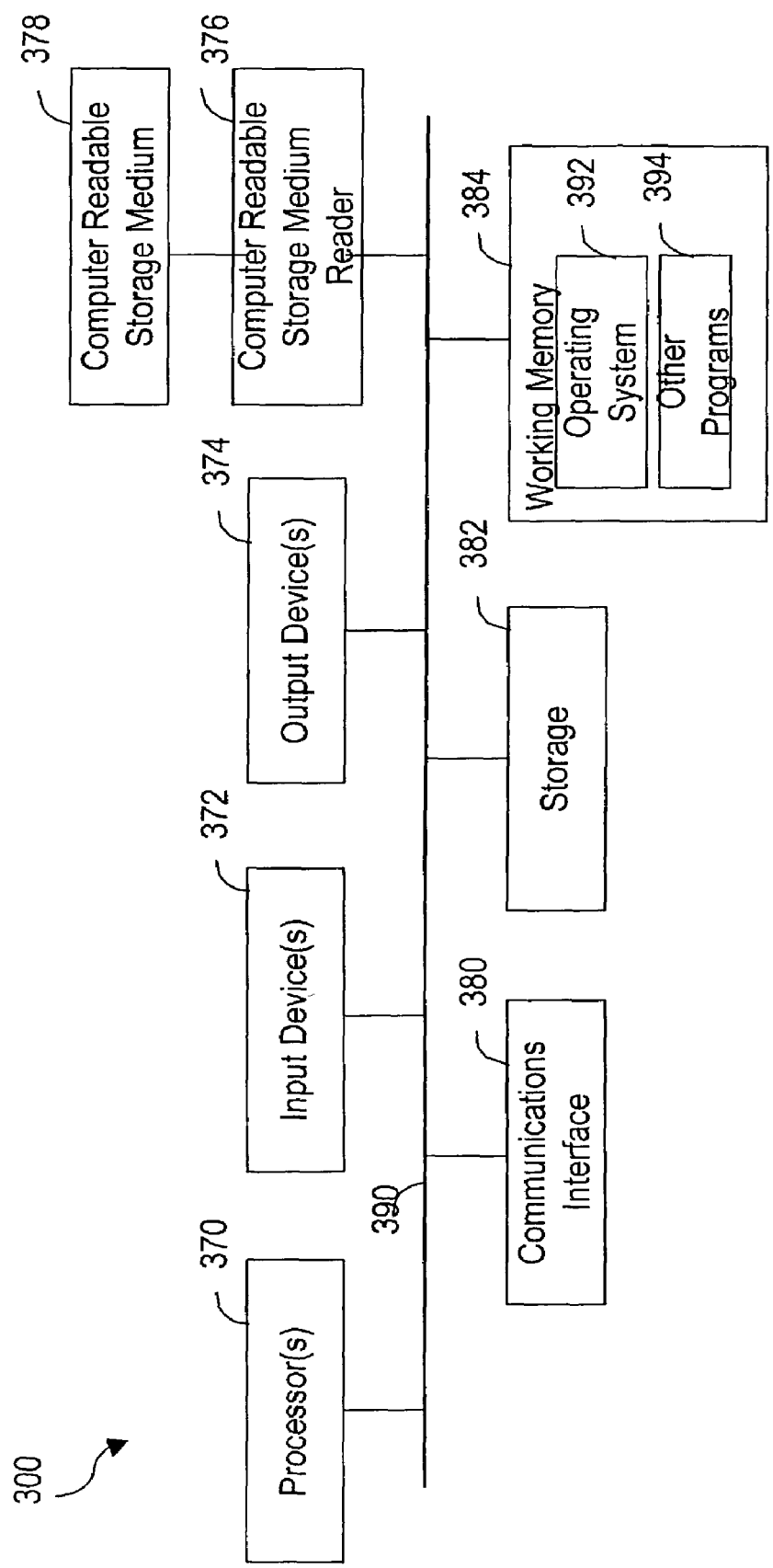
FIG. 3 illustrates a block diagram of a representative computer system in a specific embodiment of the present invention.

FIG. 3 illustrates a block diagram of a representative computer system in a specific embodiment of the present invention. As illustrated by FIG. 3, computing system 300 can embody one or more of the elements illustrated by FIG. 1A in various specific embodiments of the present invention. While other application-specific alternatives might be utilized, it will be presumed for clarity sake that the elements comprising the computer system 300 are implemented in hardware, software or some combination thereof by one or more processing systems consistent therewith, unless otherwise indicated.

Computer system 300 comprises elements coupled via communication channels (e.g. bus 390) including one or more general or special purpose processors 370, such as a Pentium® or Power PC®, Solaris®, digital signal processor ("DSP"), and the like. System 300 elements also include one or more input devices 372 (such as a mouse, keyboard, microphone, pen, and the like), and one or more output devices 374, such as a suitable display, speakers, actuators, and the like, in accordance with a particular application.

System 300 also includes a computer readable storage media reader 376 coupled to a computer readable storage medium 378, such as a storage/memory device or hard or removable storage/memory media; such devices or media are further indicated separately as storage device 380 and memory 382, which can include hard disk variants, floppy/compact disk variants, digital versatile disk ("DVD") variants, smart cards, read only memory, random access memory, cache memory, and the like, in accordance with a particular application. One or more suitable communication devices 384 can also be included, such as a modem, DSL, infrared or other suitable transceiver, and the like for providing inter-device communication directly or via one or more suitable private or public networks that can include but are not limited to those already discussed.

Working memory further includes operating system ("OS") elements and other programs, such as application programs, mobile code, data, and the like for implementing system 300 elements that might be stored or loaded therein during use. The particular OS can vary in accordance with a particular device, features or other aspects in accordance with a particular application (e.g. Windows, Windows NT, Mac, Linux, Unix or Palm OS variants, a proprietary OS, and the like). Various programming languages or other tools can also be utilized, such as known by those skilled in the art. As will be discussed, embodiments can also include a network client such as a browser or email client, e.g. as produced by Netscape, Microsoft or others, a mobile code executor such as a Java Virtual Machine ("JVM"), and an application program interface ("API"), such as a Microsoft Windows compatible API. (Embodiments might also be implemented in conjunction with a resident application or combination of mobile code and resident application components.)

One or more system 300 elements can also be implemented in hardware, software or a suitable combination. When implemented in software (e.g. as an application program, object, downloadable, servlet, and the like in whole or part), a system 300 element can be communicated transitionally or more persistently from local or remote storage to memory (or cache memory, and the like) for execution, or another suitable mechanism can be utilized, and elements can be implemented in compiled or interpretive form. Input, intermediate or resulting data or functional elements can further reside more transitionally or more persistently in a storage media, cache or more persistent volatile or non-volatile memory, (e.g. storage device 380 or memory 382) in accordance with a particular application.

FIGS. 4A-4D illustrate flow charts of representative techniques for monitoring and managing computer access and activity in various specific embodiments of the present invention.

Figure 4A:
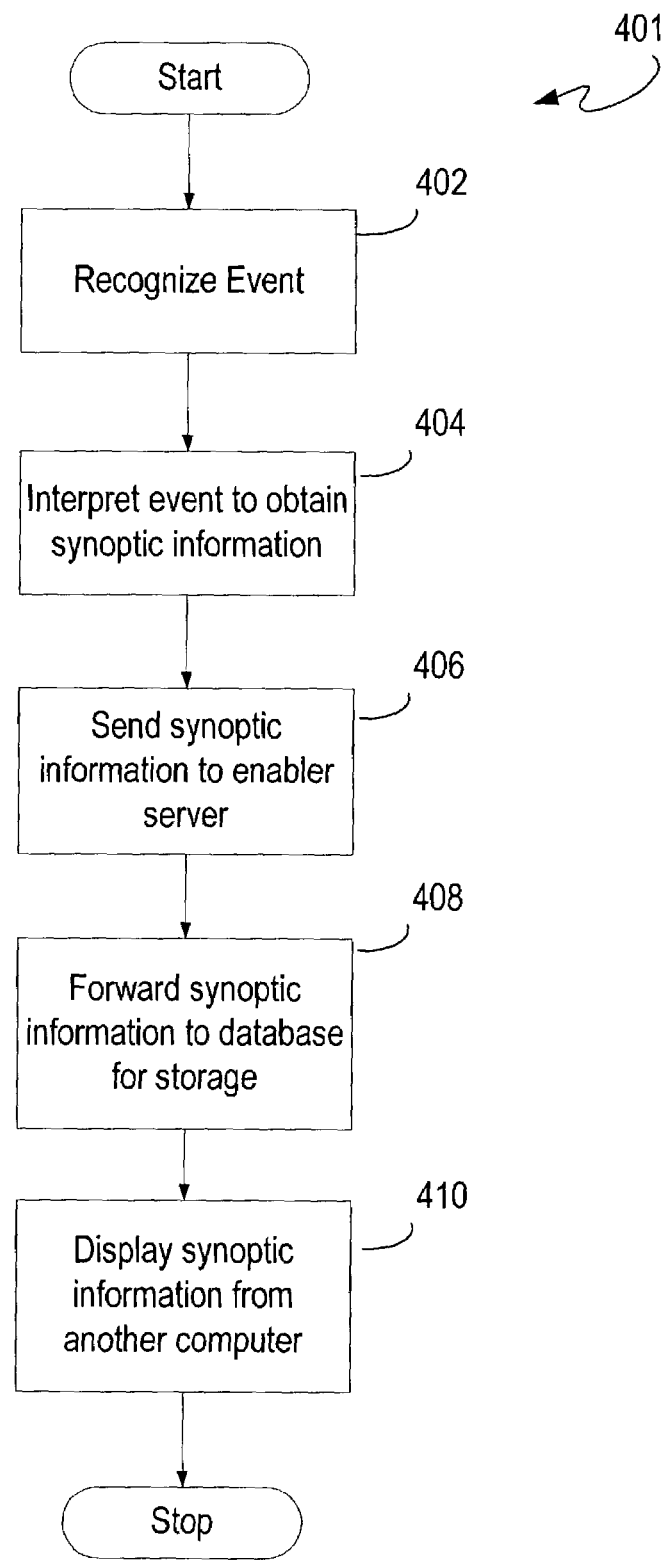
FIGS. 4A-4D illustrate flow charts of representative techniques for monitoring and managing computer access and activity in various specific embodiments of the present invention.

FIG. 4A illustrates a representative technique for providing a user environment at a computer, such as computer 100 of FIG. 1A, for example. As illustrated by a flowchart 401 of FIG. 4A, in a specific embodiment, events (or activities) can be recognized at a representative computer in 402. In accordance with various application specific criteria, the events may comprise any of a system event, a file subsystem event, such as a disk access, a user input, such as a keystroke, a mouse input, a selection made at a touch screen device, a trackball input, for example, a network event, such as incoming or outgoing messages from a communications interface, an internal system fault, an external change in environment detected by any of a variety of sensing devices, an input/output (I/O) event, such as printing for example, or the like, or a combination thereof. The events may be interpreted to obtain synoptic information in 404. Next, the synoptic information may be sent to an enabler server in 406. In specific embodiments, the synoptic information may be forwarded to a database for storage in 408. Then, the synoptic information about at least one other computer can be displayed in 410. The synoptic information from another computer can be displayed by updating a Graphical User Interface (GUI) based upon the synoptic information received, for example. In specific embodiments, updating the GUI provides a display of events taking place on each of a plurality of interconnected computers in system 1.

Figure 4B:
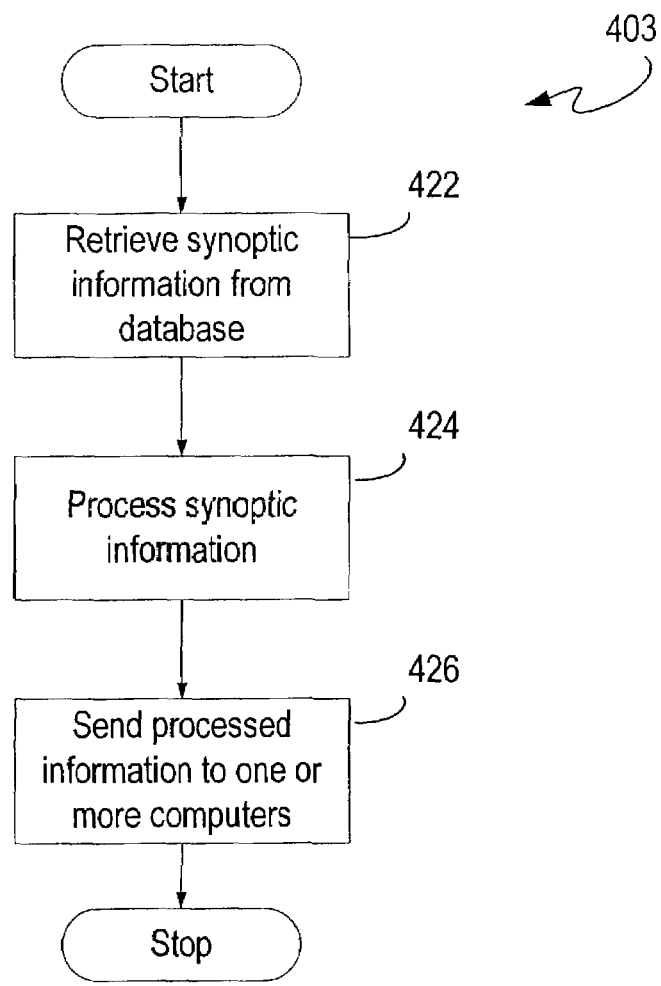

FIG. 4B illustrates a representative technique for providing a user environment at an enabler server, such as enabler server 140 of FIG. 1A, for example. As illustrated by a flowchart 403 of FIG. 4B, in a specific embodiment, computer synoptic information for a particular computer may be retrieved from a database 422. The computer synoptic information may be processed 424 to form processed information. In select specific embodiments, processing comprises incorporating information based upon a user identity provided during logon into the computer synoptic information, for example. The processed information may be forwarded to at least one computer for display 426. In some specific embodiments, forwarding comprises providing the information in a format displayable in a report area for messages on at least one of a plurality of computers.

In select specific embodiments, processing comprises analyzing the computer synoptic information. A variety of analysis techniques are provided in accordance with various specific embodiments of the present invention. In a representative embodiment, analyzing comprises determining at least one of web access time, mail count, print job count, logon time, for example. In some embodiments, analyzing comprises selecting from among the computer synoptic information based upon a user preference. Analyzing also includes generating reports in some specific embodiments. In select embodiments, analyzing comprises tracking the computer synoptic information to determine if one or more items has exceeded prescribed limits.

Figure 4C:
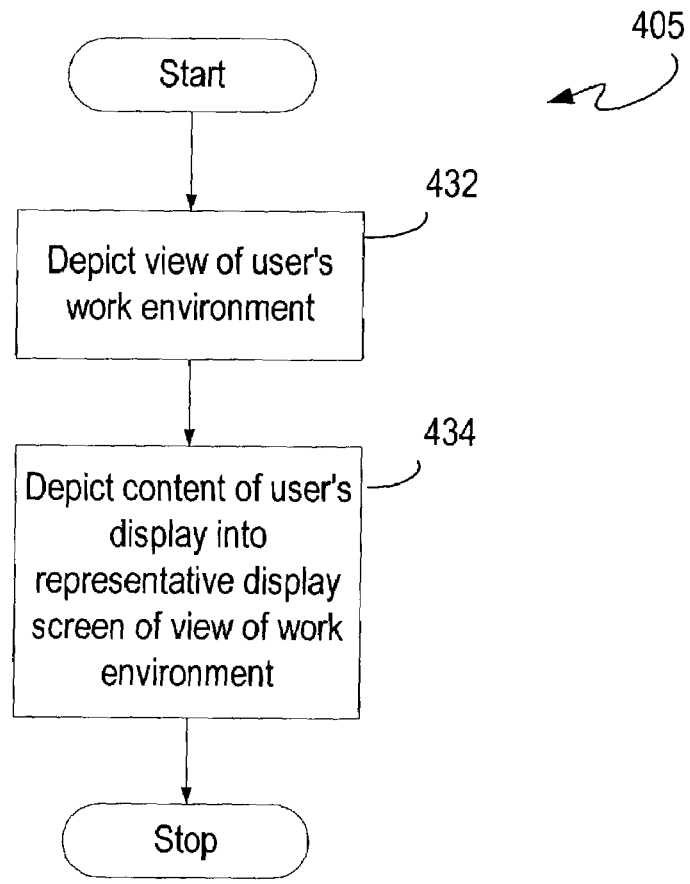

FIG. 4C illustrates a representative technique for providing a user interface at a computer, such as computer 100 of FIG. 1A, for example. As illustrated by a flowchart 405 of FIG. 4C, in a specific embodiment, a view of a first user's work environment from the perspective of the first user on a screen of a second user may be displayed 432. The work environment may comprise a representation of the first user's device, which may be a computer, telephone, or other device for example. Content of the first user's display may be displayed into the representation of the first user's device on the screen of the second user 434. In specific embodiments, the processing illustrated by flowchart 405 can provide a "virtual look over the shoulder view" of the content and environment of the first user's device displayed on the screen of the second user.

Figure 4D:
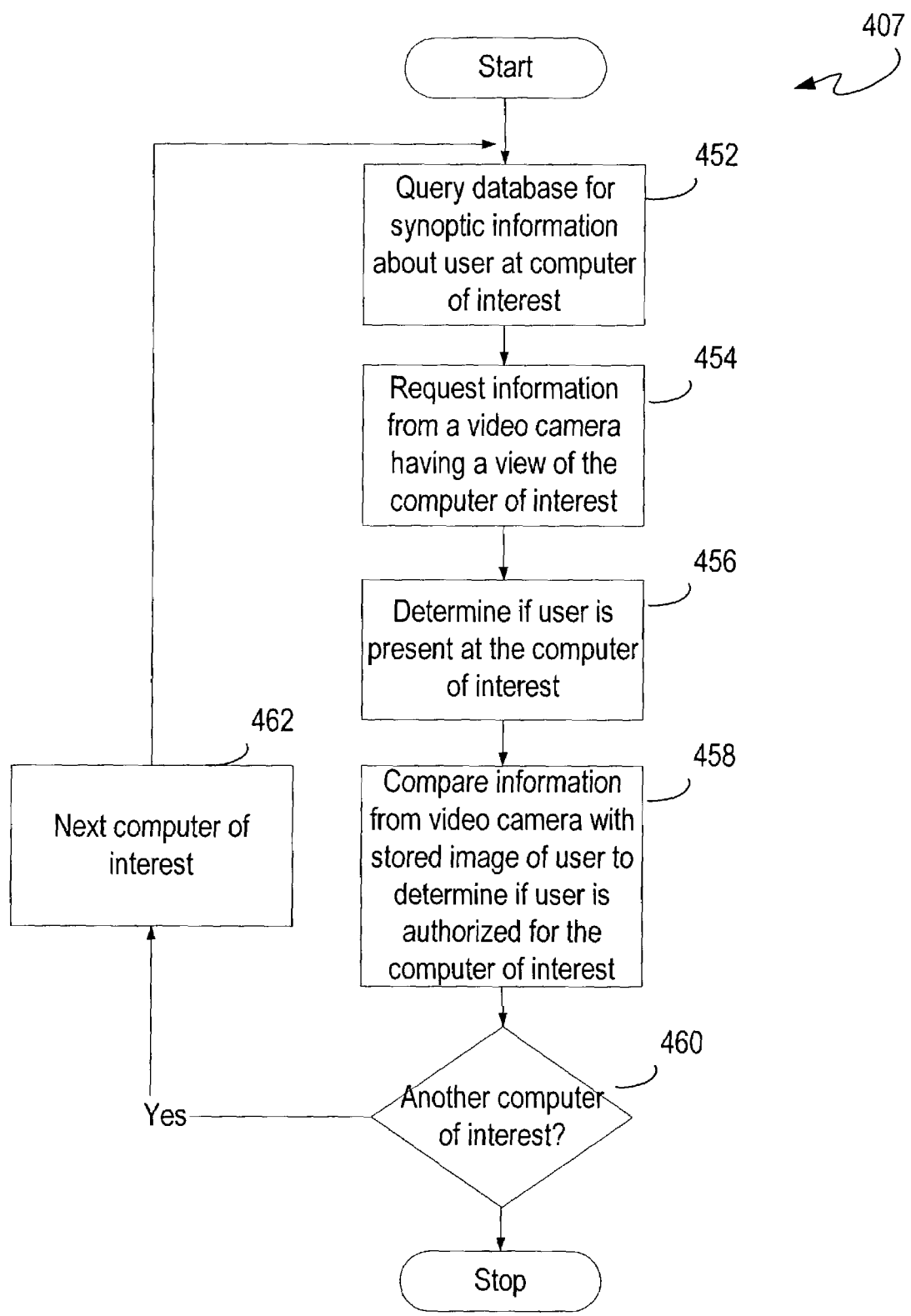

FIG. 4D illustrates a representative technique for monitoring security at one or more computers in a work area(s) of interest, such as computer 100 of FIG. 1A, for example. As illustrated by a flowchart 407 of FIG. 4D, in a specific embodiment, a query from a database for synoptic information about a user logged into a computer located at a work area of interest is made 452. Then, information from a video camera having a view of the user's work area is requested 454. From the synoptic information about the user and the output of the video camera, a determination of whether the user is present in his work area may be made 456. By comparison of the image of the user from the video camera to a stored video image of the correct user assigned to the work area, a determination of whether the correct person is at the work area may be made 458. Thereupon, a determination of whether there are other work areas of interest can be made 460. If so, the next work area of interest may be selected 462, and the monitoring can repeat for the new work area of interest.

Figure 5A:
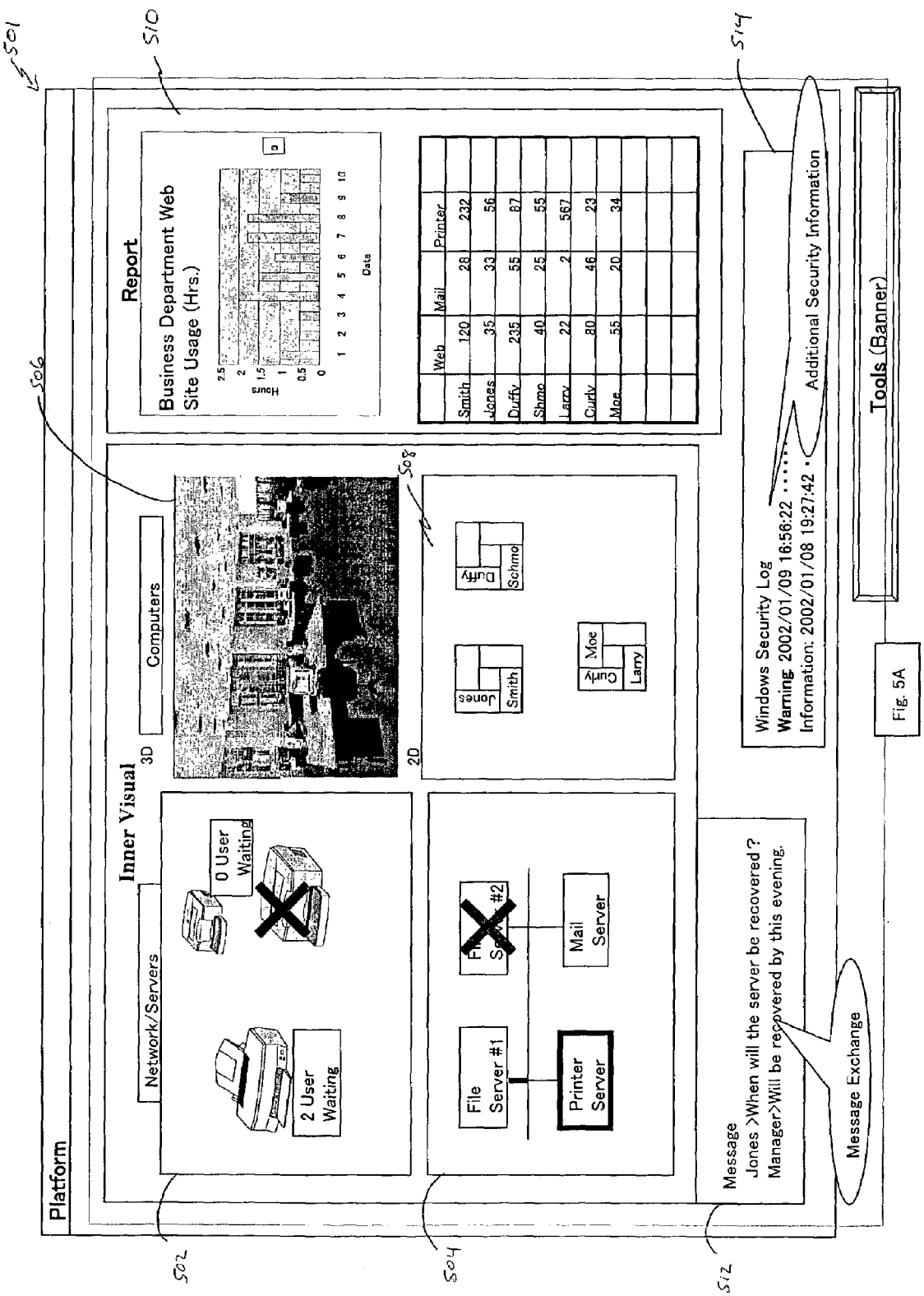
FIGS. 5A-5H illustrate representative screens provided by graphical user interface (GUI) in various specific embodiments of the present invention.

FIGS. 5A-5H illustrate representative screens provided by graphical user interface (GUI) in various specific embodiments of the present invention. In FIG. 5A, a representative screen 501 of a graphical user interface depicts one way to show the status of a number of computers and other elements in system 1, for example, in a specific embodiment. Screen 501 comprises a plurality of panels, with each panel indicating information about one or more elements of system 1. A panel 502 provides information about status of printers, for example, comprising system 1. A panel 504 indicates the availability of other devices, such as file servers, printer servers, mail servers and the like, comprising system 1. A panel 506 provides a 3-dimensional perspective of a user environment, such as an office, laboratory, factory floor or the like, for example, served by system 1. A panel 508 provides a 2-dimensional perspective of the user environment, showing individual computers, and user identifiers corresponding to individuals using the computers. In select implementations, other information can also be displayed in addition to, or instead of, the user identifier. A report panel 510 provides display of computer synoptic information derived from application of one or more analyses to the information about individual computers. In the example illustrated by report panel 510, a graph of web site usage duration vs. date and a table of web site accesses, emails and printer usage by individuals are provided. In another example embodiment, report panel 510 can provide an indication that a particular element of the computer synoptic information has exceeded prescribed limits, for example. In specific embodiments, these and other analyses reports can provide indications of productivity of the system 1, as well as of individual users and devices, for example. A message area 512 provides viewing of message traffic among users on system 1. A banner area 514 provides display of warning messages of interest to all users on system 1.

Figure 5B:
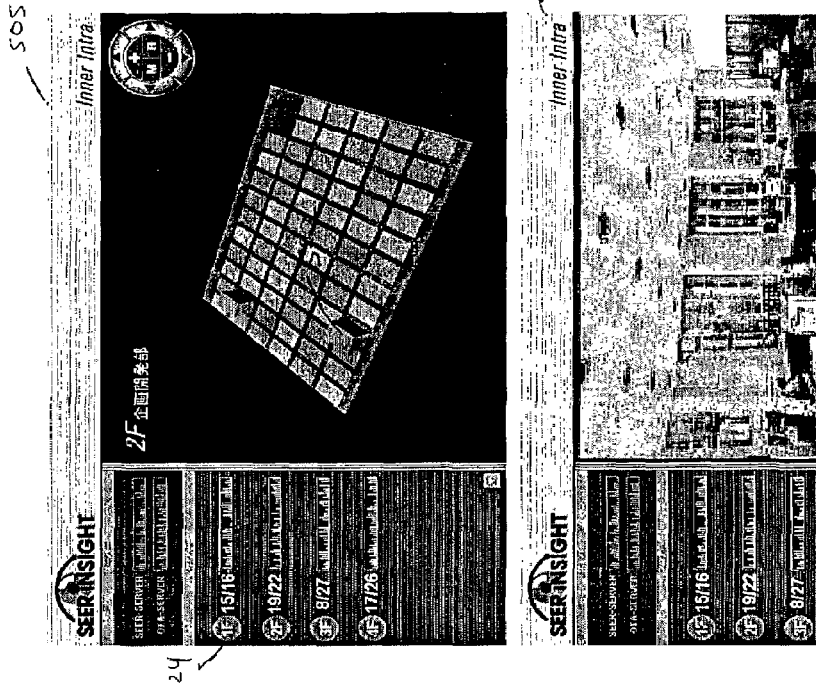
Figure 5B:
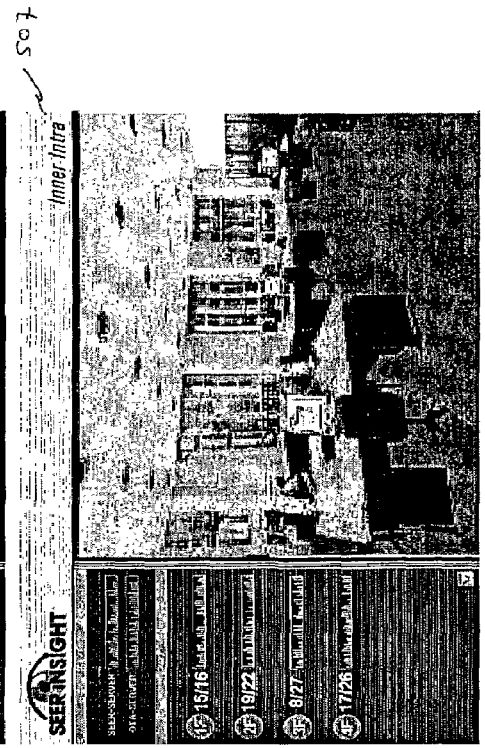
Figure 5B:
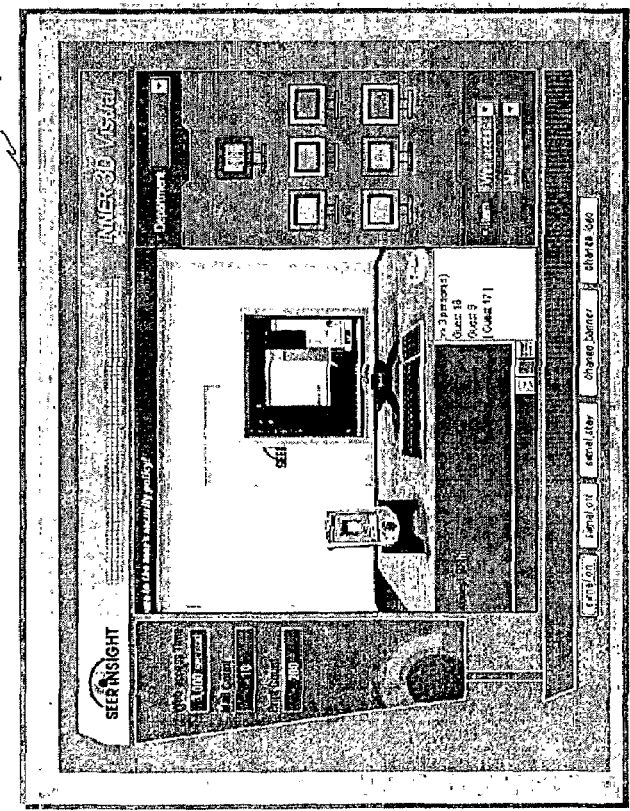

FIG. 5B illustrates various representative 3-dimensional presentation screens that can provide information about usage in system 1 in a specific embodiment of the present invention. A first screen 503 in FIG. 5B shows a pictorial representation of a particular work area belonging to a user in a work group. Using the features displayed in screen 503, a viewer can monitor the activities conducted by individuals in the group. The features and information provided by screen 503 will be described in greater detail with reference to FIG. 5C below. Another screen 505 shows a representation of users on a particular floor 520, in this case the users belong to the planning department on the second floor. Some users, for example, users who are currently logged into their computers, can be represented by raised rectangles 522. Other users, such as those not currently logged into their computer, for example, may be represented by non-raised rectangles. In this way, computers in which the user is not currently logged in can be distinguished from other computers by viewing screen 505. One or more buttons and icons may be provided to enable the viewer to alter the environment being viewed. For example, a plurality of buttons 524 enable the viewer of this implementation to change between floors in a building. While rectangles are used to depict computers in screen 505, other types of representations can be used in various implementations. FIG. 5B further illustrates a screen 507 depicting a 3-dimensional view of a work environment served by system 1 in a specific embodiment of the present invention. Screen 507 illustrates the presence or absence of users at various computers using this work environment view paradigm.

Figure 5C:
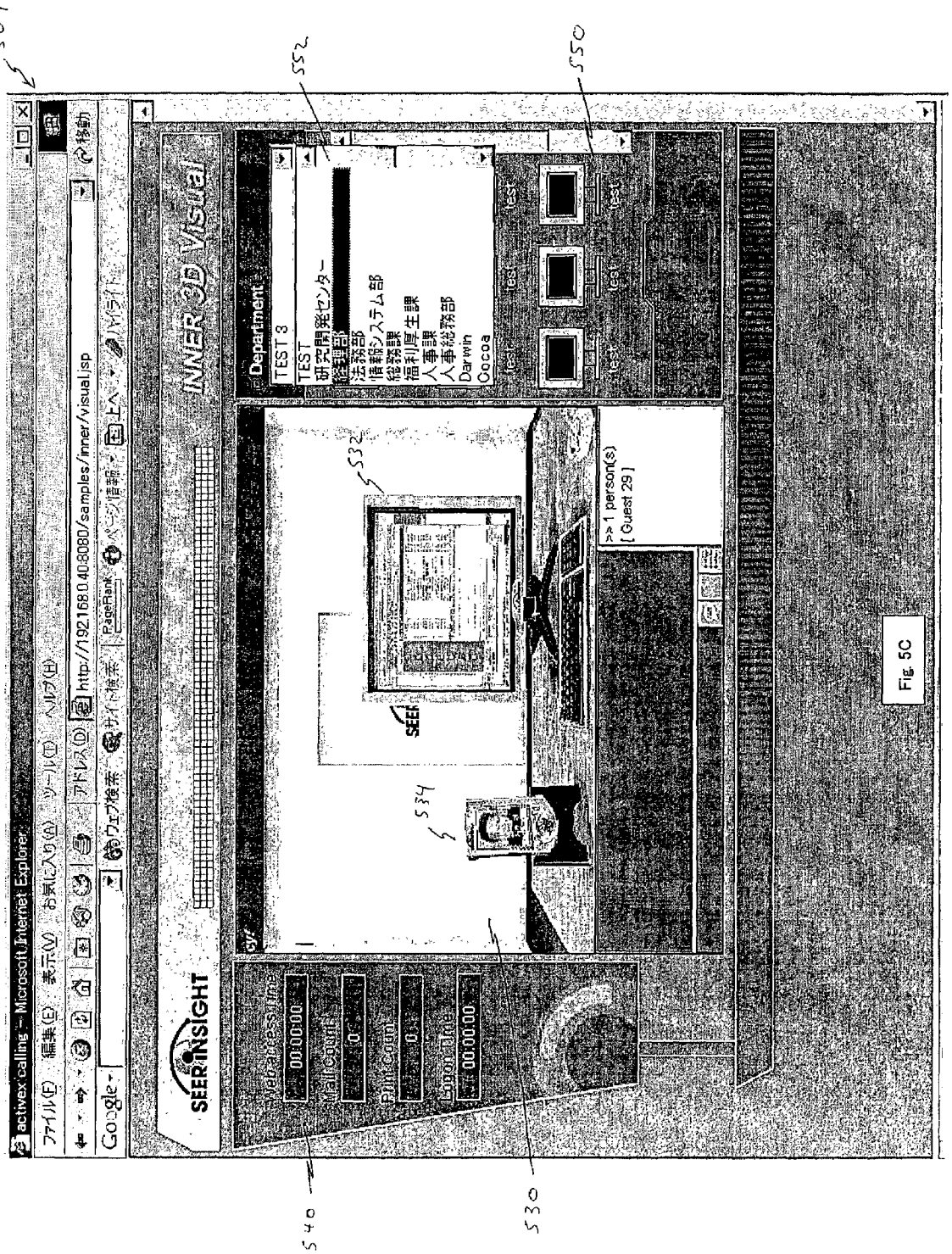

FIG. 5C illustrates a screen 509 which shows a pictorial representation of a particular user's work area, such as provided by screen 503 in FIG. 5B in a specific embodiment. In a section 530, screen 509 depicts a users' work area view, providing a virtual "look over the shoulder" view of the user's computer. The section 530 provides information about the items currently displayed on the user's computer in the form of a computer display screen 532, and a picture of the user, in the form of a display on a PDA 534. In the example illustrated by screen 509, the computer display screen 532 and PDA 534 are presented in a "virtual work area" display paradigm. Other forms of displaying the user's work and/or identity may be provided in various specific embodiments. Another section 540 provides information about the user's work activities in a statistical format. In representative section 540, a table of web site access time, emails, printer usage and logon time for the user is provided. A yet further section 550 of screen 509 provides a list box 552 mechanism for selecting from among a number of departments. By scrolling down the items listed in list box 552, the viewer can select a department of individuals whose activities can be monitored. Presently, personnel from Test Department No. 3 are being viewed.

Figure 5D:
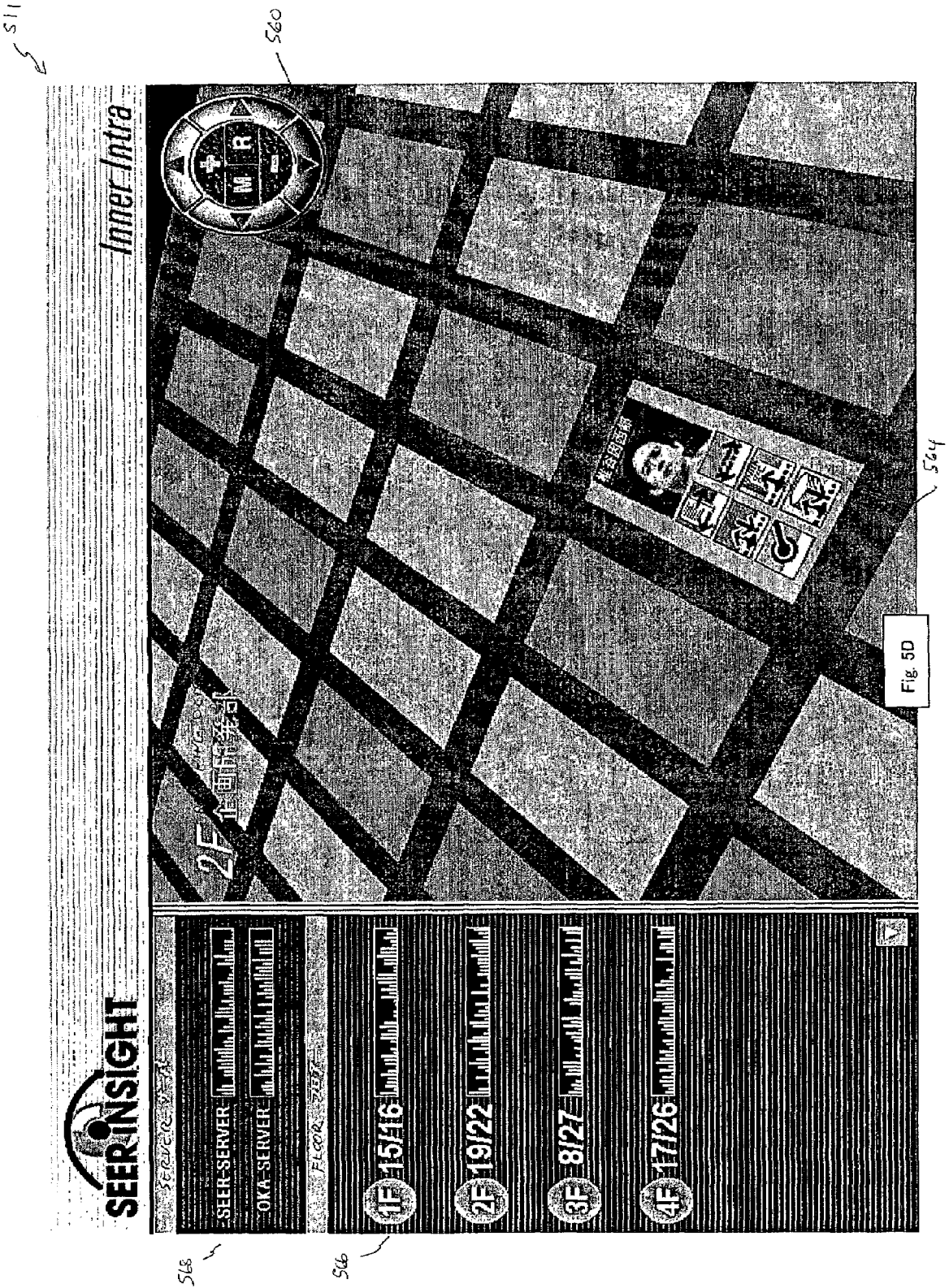

FIG. 5D illustrates a screen 511 which shows a pictorial representation of a particular user's work area, such as provided by screen 505 in FIG. 5B in a specific embodiment. In a section 560, screen 511 depicts a representation of users on a particular floor 562; in this case the users belong to the planning department on the second floor. Some users, for example, users who are currently logged into their computers, can be represented by rectangles, such as rectangle 564. Information about the user, such as identification information including a name and in select implementations, a picture, may be included in rectangle 564. Optionally, rectangle 564 can include one or more icons providing access to a variety of information about the user. By selecting an icon, the viewer can be presented with information about the depicted user, such as web site access time, emails, and printer usage and logon time for the user. In some embodiments, a user may drag and drop an icon for a data object into the rectangle 564 in order to send the data object over the network to the user depicted in the rectangle 564. In this way, information can be shared more easily among users of the system 1. One or more buttons and icons may be provided to enable the viewer to alter the environment being viewed. For example, a plurality of buttons 566 enable the viewer of this implementation to change between floors in a building. A display area 568 can provide indication of server usage in some embodiments. In a specific embodiment, color may be used to indicate distinguishing characteristics about various users. For example, in a representative embodiment, depicting rectangle 564 in blue can indicate that the user is currently logged in, while black can depict not presently in the office. In this way, computers in which the user is not currently logged in can be distinguished from other computers by viewing screen 505. Red can be used to depict a user that has violated a particular rule established for users of system 1. In this way, security exceptions can be flagged for enforcement personnel. While rectangles are used to depict computers in screen 511, other types of representations can be used in various implementations.

Figure 5E:
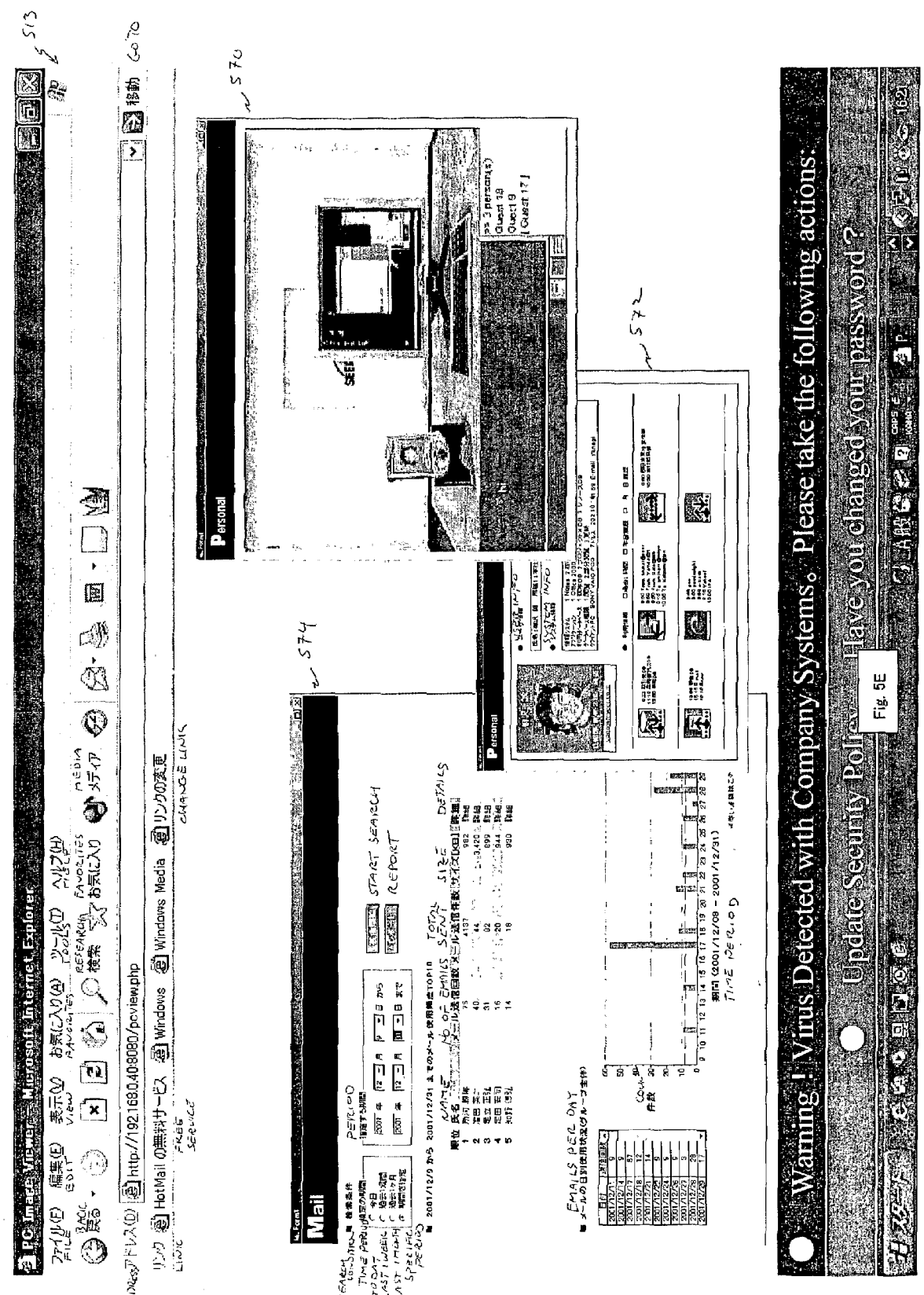

FIG. 5E illustrates a screen 513 comprising a plurality of information display screens in a specific embodiment of the present invention. A first screen 570 provides an "over the shoulder" look at the work environment of a particular (fictional) user logged into one of the computers of system 1. Screen 570 provides one presentation of the user's computer that is analogous to that of FIG. 5C. A second screen 572 provides a variety of user specific information, which may include information such as a picture of the user, name and department and/or work location, statistics about the disk or other storage accesses made by the user, emails sent or received, Web sites visited, programs accessed, printer usage and logon time for the user. A third screen 574 provides information about the mail sent and received by the user. While embodiment specific alternative exist, screen 574 can include information such as a search facility for receiving parameters for searching the email of the user, a report area that provides individual emails along with various details such as the recipient or sender, the size of the email and so forth, a table of the number of emails sent broken down by time period, such as daily, for example, and in select embodiments, a graph presentation of one or more of the above types of information.

Figure 5F:
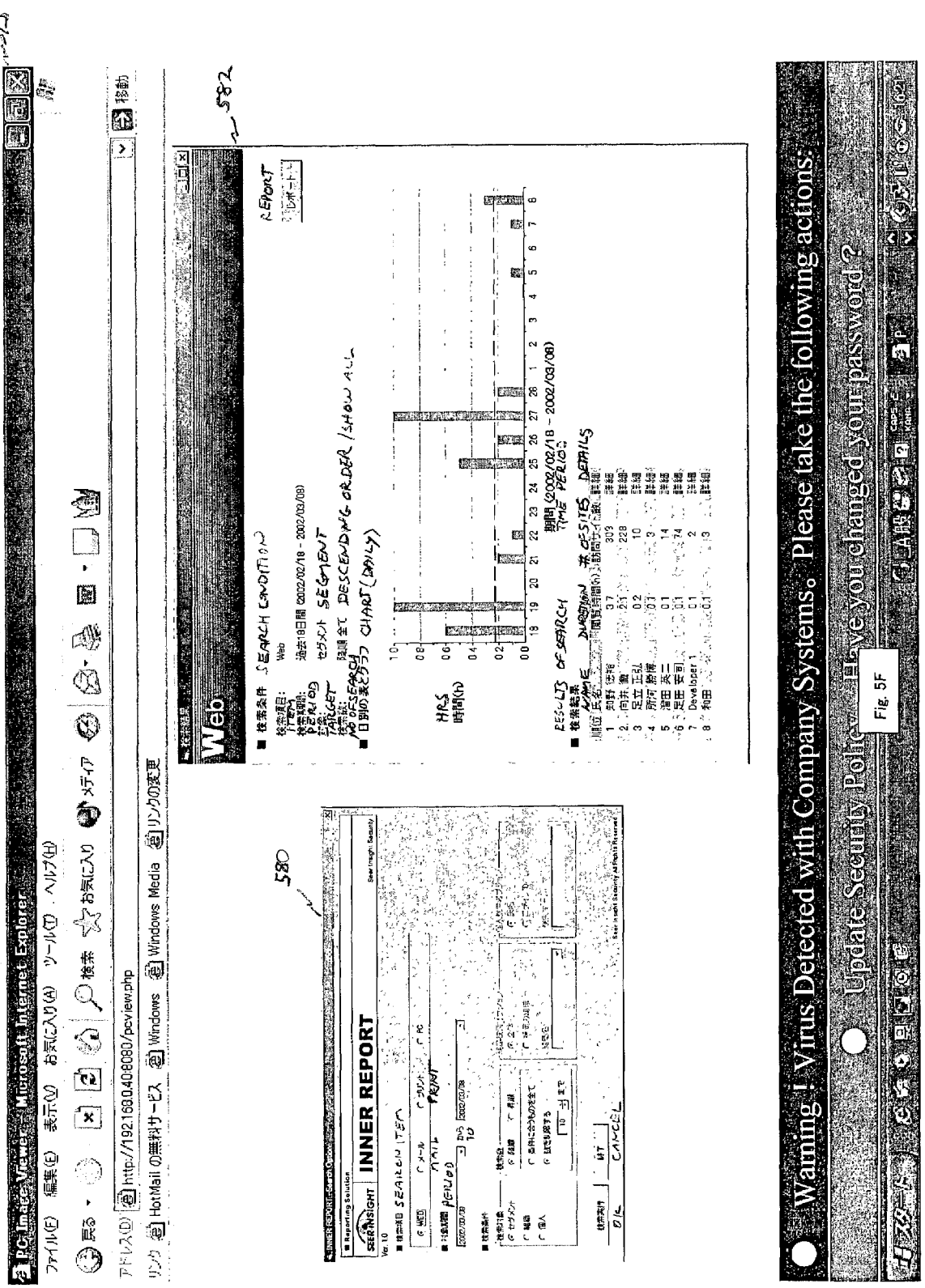

FIG. 5F illustrates a screen 515 comprising a plurality of screens related to report generation in a specific embodiment of the present invention. As shown in FIG. 5F, a screen 580 provides a mechanism for the user, such as a system administrator, for example, to obtain report information. A screen 582 shows a representative Web usage report that can be generated for users in system 1 in a specific embodiment. While application specific alternatives exist, in the embodiment illustrated by FIG. 5F, screen 582 provides information about the duration of Web usage for each of the days in the period requested by the user's selections input in the fields of screen 580 in bar graph format. Screen 582 also shows a list of individuals' by name, duration and a count of the number of sites for each individual's Web usage and other details. The user is provided the capability to change the number and selection of the individuals viewed, as well as the order in which the results are displayed using the input fields of screen 580 in the specific embodiment illustrated.

Figure 5G:
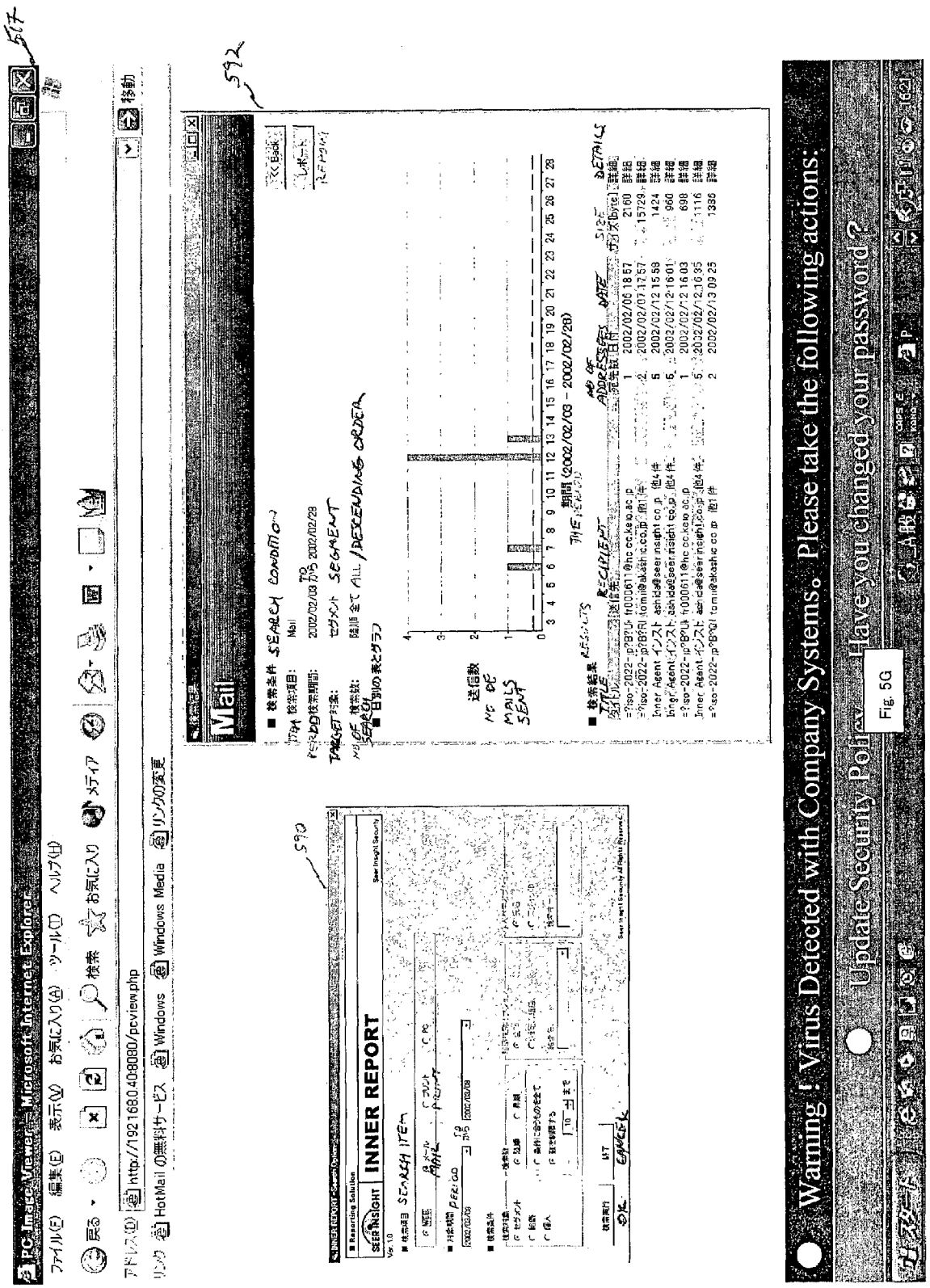

FIG. 5G illustrates a screen 517 comprising a plurality of screens related to report generation in a specific embodiment of the present invention. As shown in FIG. 5G, a screen 590 provides a mechanism for the user, such as a system administrator, for example, to obtain report information. A screen 592 shows a representative mail usage report that can be generated for users in system 1 in a specific embodiment. While application specific alternatives exist, in the embodiment illustrated by FIG. 5G, screen 592 provides information about the number of mails sent for each of the days in the period requested by the user's selections input in the fields of screen 590 in bar graph format. Screen 592 also shows a list of mails along with individual mail recipients' addresse(s), a count of the number of addressees for each individual mail, the date sent, the size of the mail, and other details. The user is provided the capability to change the number and selection of the mails viewed, as well as the order in which the results are displayed using the input fields of screen 590 in the specific embodiment illustrated.

Figure 5H:
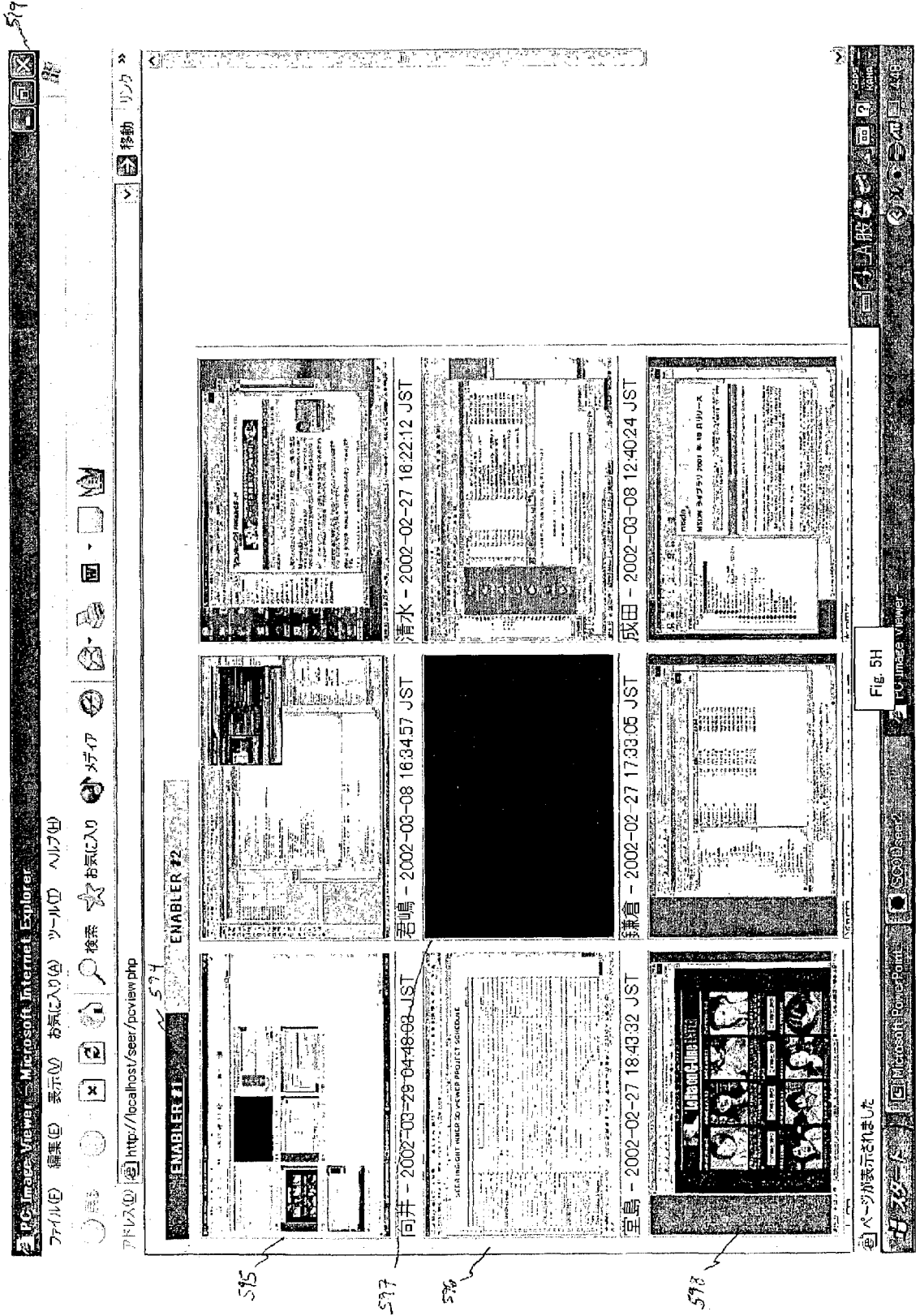

FIG. 5H illustrates a screen 519 that shows a pictorial representation of a content of a number of computer screens of users in system 1 in a specific embodiment. A selection tab 594 enables the user to select from among a plurality of enabler servers, such as enabler server 140 of FIG. 1A. A screen 596 illustrates a normal application being used on the computer of one of the users of the computers in system 1. A dark screen 597 indicates that there is no user logged on to this particular computer in system 1. Perhaps this computer's user is not in the office today. A screen 598 shows that one of the users of the computers in system 1 is viewing unauthorized materials. A screen 595 shows that the user of the computer corresponding to this screen is also monitoring the screens of other users in the system 1.

The preceding has been a description of the preferred embodiment of the invention. While generally described with reference to computer systems, the present invention is not so limited. Embodiments of the present invention may be broadly applied to systems created using a broad array of devices, such as a phone, a mobile phone, a personal data assistant (PDA), pager, computer, navigation system, global positioning system (GPS) device, a digital camera, video camera, home-entertainment-system control box, remote garage door opener, two-way radio, baby monitor, facsimile machine, or office copy machine, for example, and other devices whether coupled using a line circuit or wirelessly. It will be appreciated that deviations and modifications can be made without departing from the scope of the invention, which is defined by the appended claims.

What is claimed is:

1. A method, comprising:
    recognizing events at a computer;
    interpreting the events to obtain synoptic information;
    forwarding the synoptic information to at least one other computer for display;
    determining if the synoptic information indicates an unauthorized access; and
    optically imaging a computer located within a work area if an unauthorized access occurs.

2. The method of claim 1 further comprising: receiving from at least one other computer synoptic information for display.

3. The method of claim 2, further comprising: updating a Graphical User Interface (GUI) based upon the synoptic information received.

4. The method of claim 3, wherein: updating the GUI provides a display of events taking place on each of a plurality of interconnected computers.

5. The method of claim 1, wherein the events comprise at least one of: a user input, a system event, a keystroke, a mouse input, a selection made at a touch screen device, a trackball input, an incoming message from a communications interface, an internal system fault, or an external change in environment detected by any of a variety of sensing devices.

6. The method of claim 3, further comprising: forwarding the computer synoptic information to a database for storing.

7. The method of claim 1, wherein the computer and the at least one other computer are in a work area and further comprising:
    notifying all computers in the work area of the unauthorized access such that peer pressure will prevent future unauthorized access.

8. The method of claim 1, further comprising:
    determining if the imaged area includes a person; and
    determining if the imaged person is an authorized user of the computer.

9. The method of claim 1, wherein the recognizing events includes recognizing absence of a user at the computer via imaging of a work area.

10. The method of claim 1, further comprising tracking the synoptic information to determine if one or more items have exceeded prescribed limits.

11. An apparatus, comprising:
    means for recognizing events at a computer;
    means for interpreting the events to obtain synoptic information;

means for forwarding the synoptic information to at least one other apparatus for display;

means for determining if the synoptic information indicates an unauthorized access; and means for optically imaging a computer located within a work area if an unauthorized access occurs.

12. A computer program product for providing a user environment at a computer, comprising:

code that recognizes events at the computer;

code that interprets the events to obtain synoptic information;

code that forwards the synoptic information to at least one other computer for display;

code that determines if the synoptic information indicates an unauthorized access;

a computer readable storage medium for holding the codes; and code that optically imaging a computer located within a work area if an unauthorized access occurs.

* * * * *